FIG. 2a'
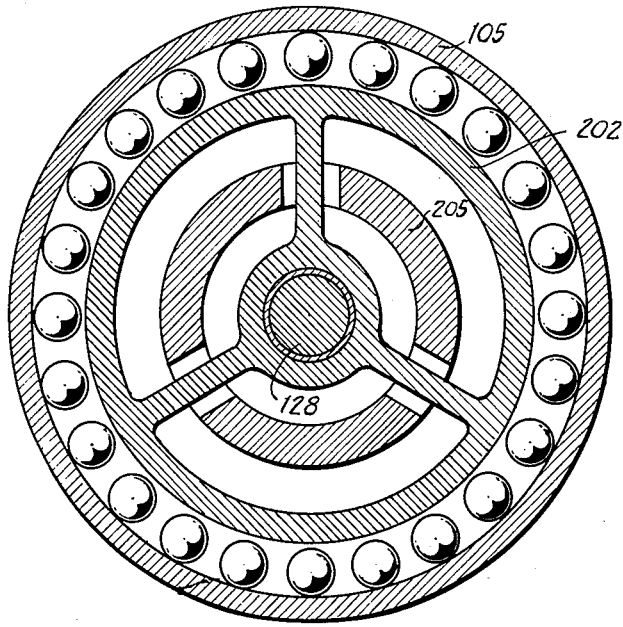
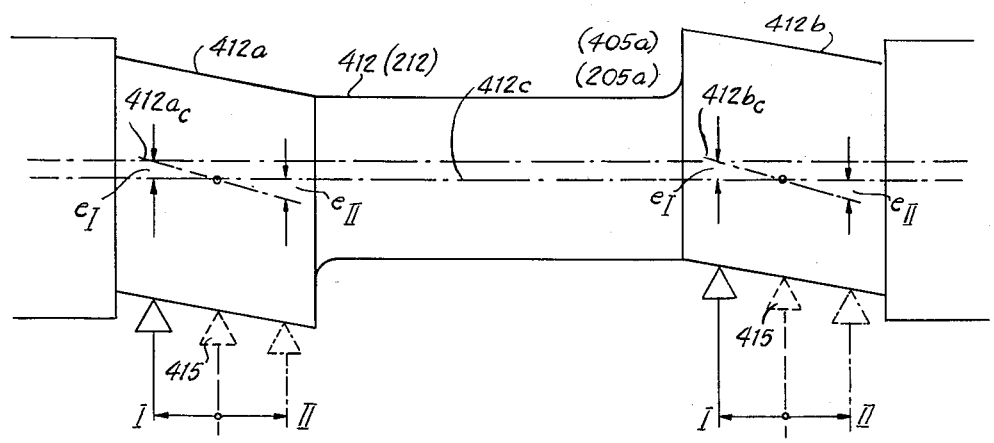
FIG. 4a

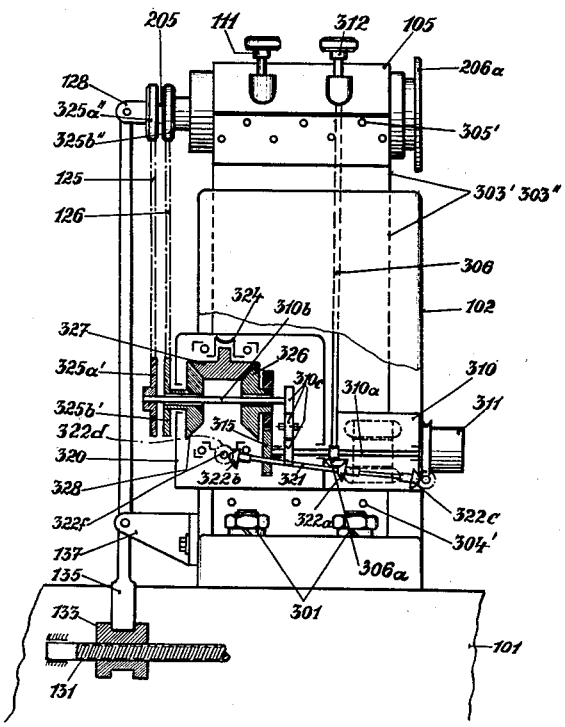
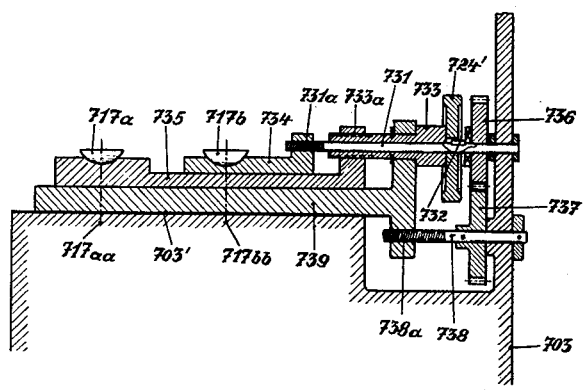

FIG. 3a
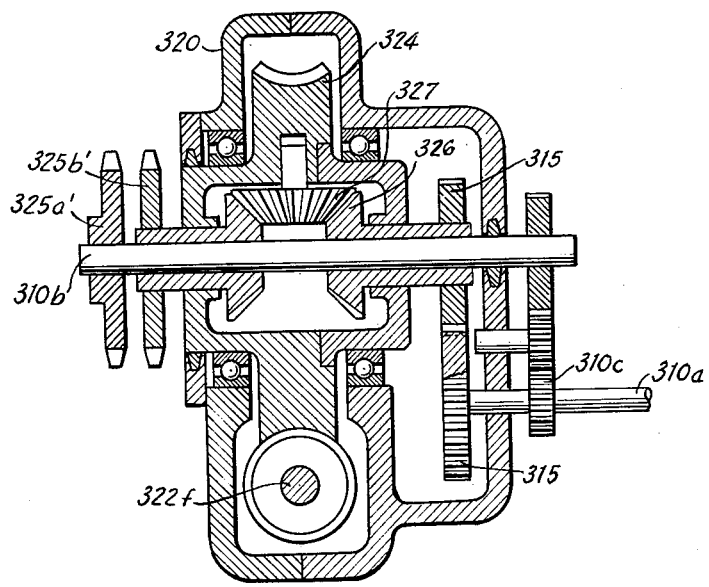
FIG. 3c
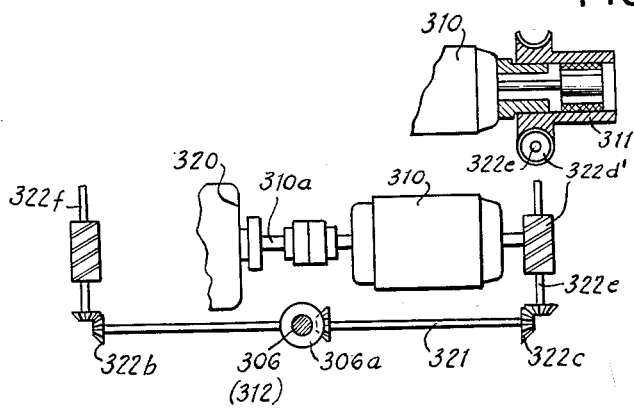
FIG. 3b

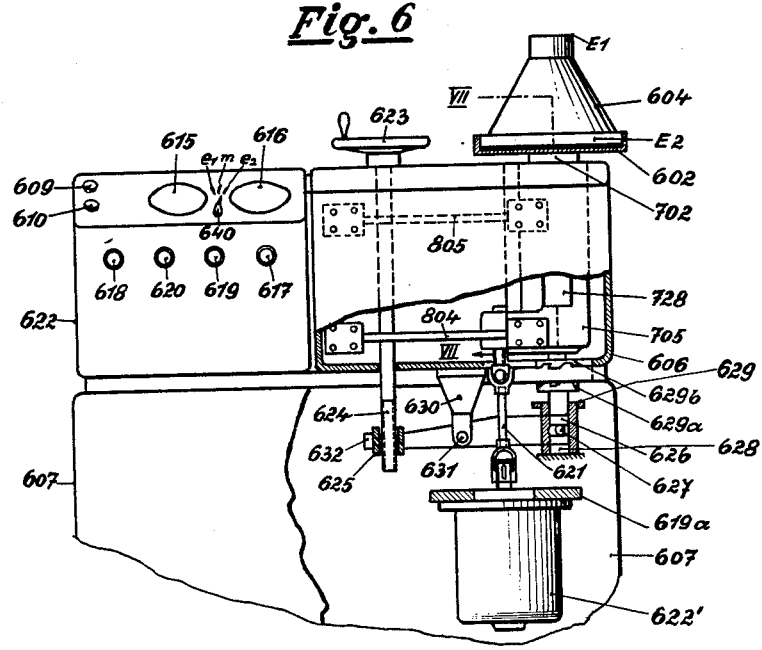
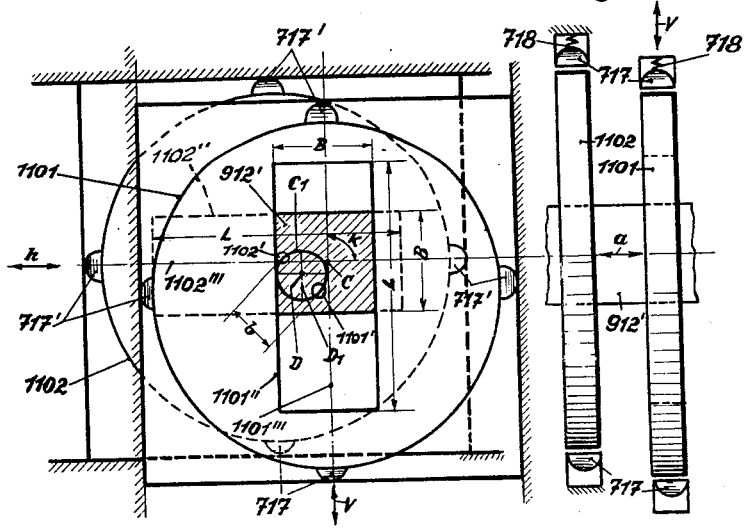

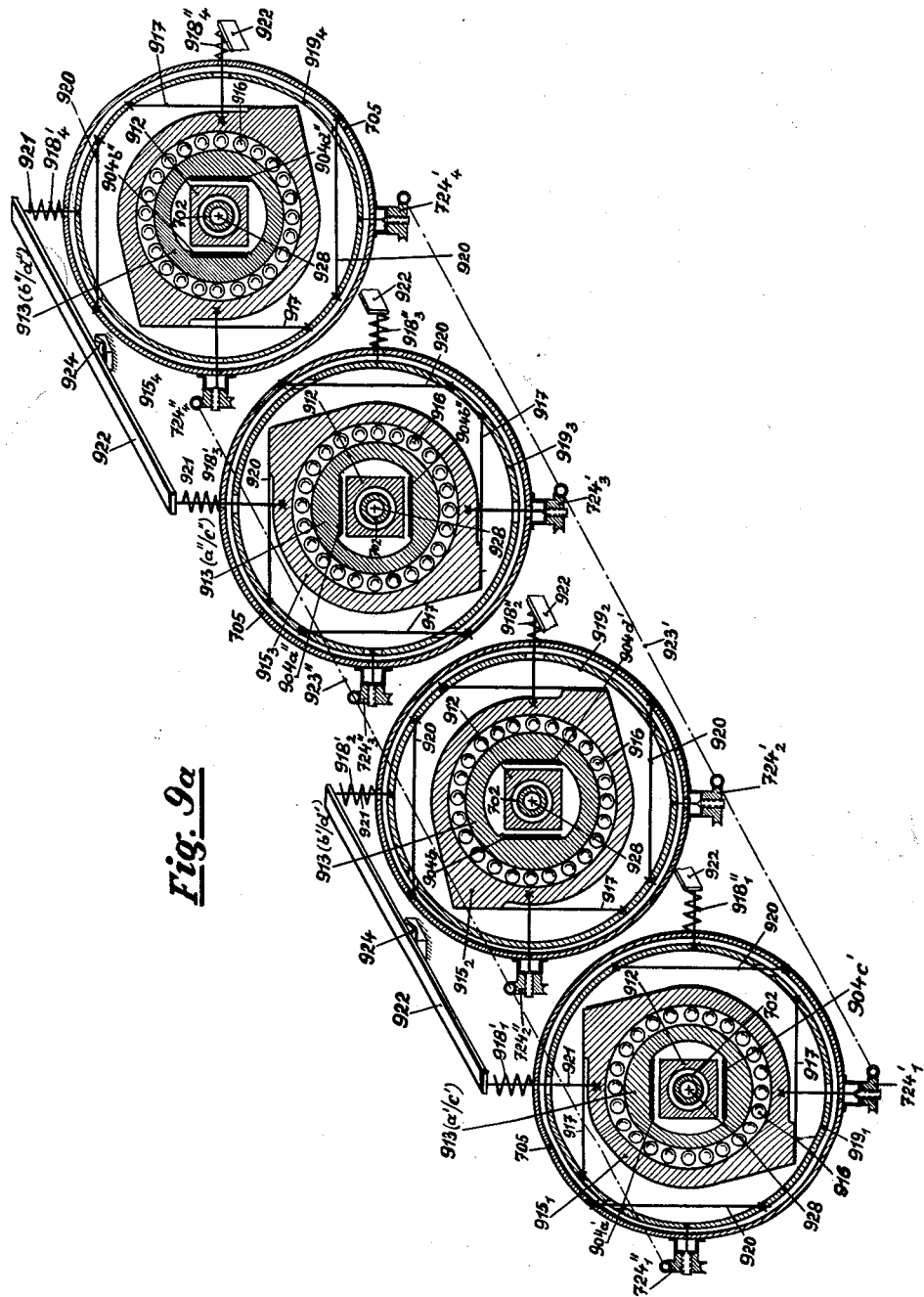

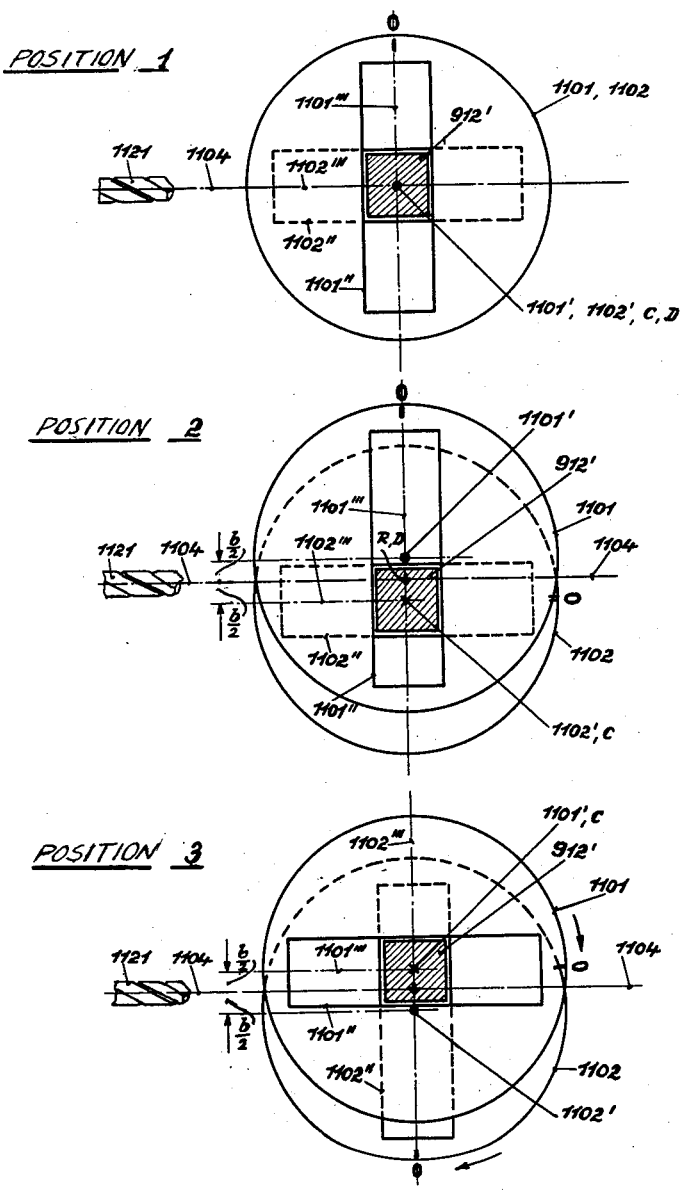

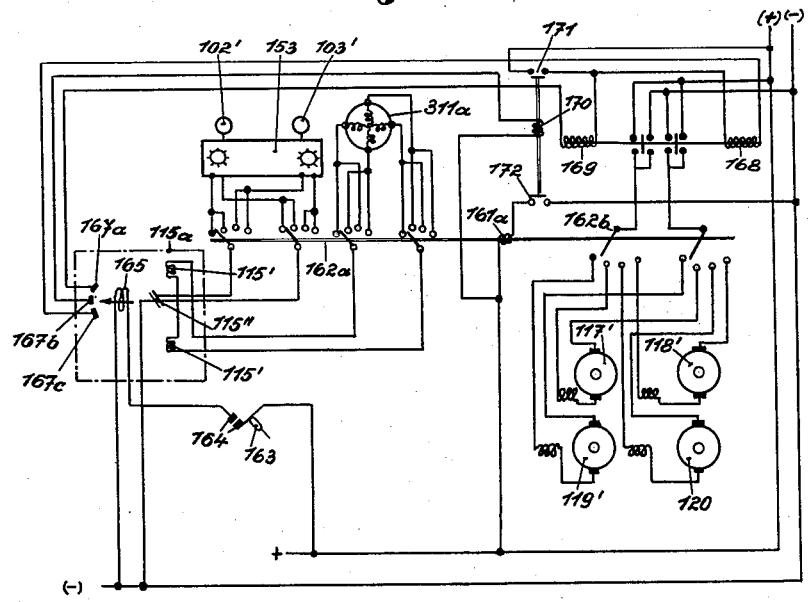

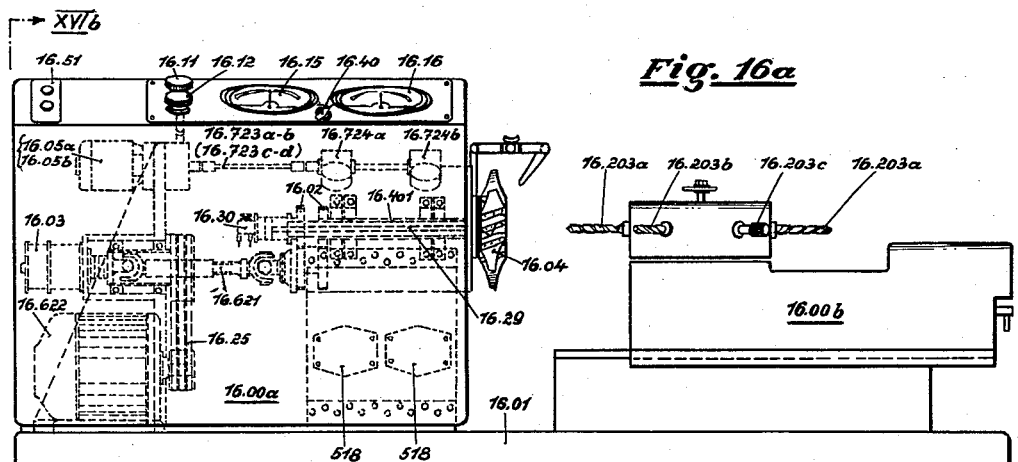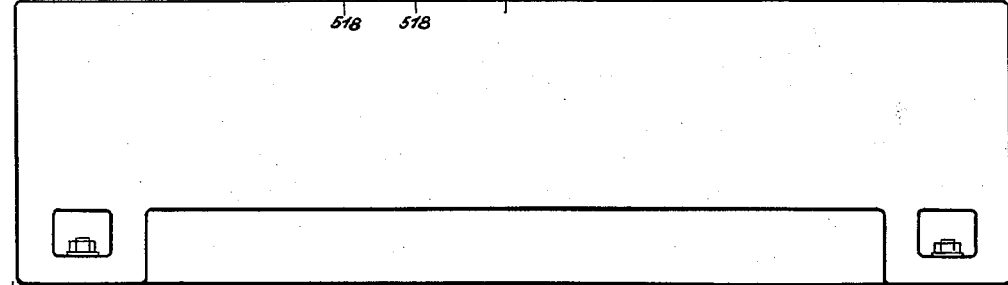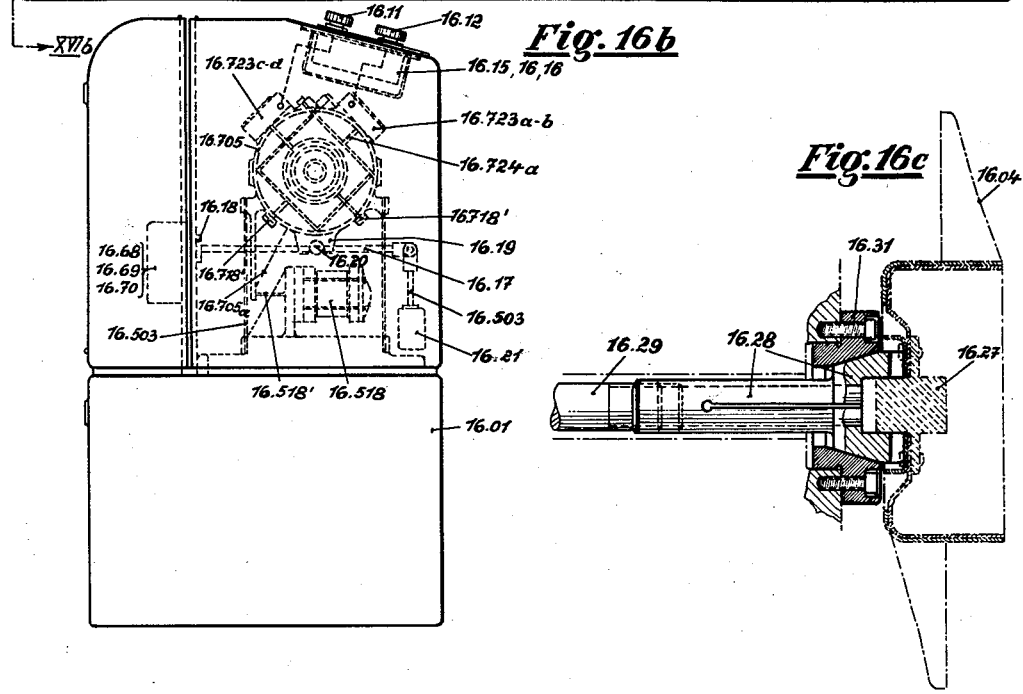

United States Patent Office 3,154,973
Patented Nov. 3, 1964

3,154,973
METHOD AND APPARATUS FOR THE BALANCE CENTERING OF ROTORS
Heinrich Hack, Darmstadt, Germany, assignor to Carl Schenck Maschinenfabrik G.m.b.H., Darmstadt, Germany, a corporation of Germany
Continuation of application Ser. No. 522,335, July 15, 1955. This application Jan. 4, 1961, Ser. No. 81,665
Claims priority, application Germany July 16, 1954
36 Claims. (Cl. 77—5)

My invention relates to the machining of rotating workpieces in the raw, prefabricated or finished state, and in a more particular aspect, to the balance centering of such workpieces, hereinafter briefly called rotors.

This application is a continuation of my copending application Serial No. 522,335, filed July 15, 1955, and now abandoned.

Assume that a body is rotating in free space. Then the rotation will occur about an inertia axis or "free axis" of the body. However, if the rotor has a shaft journalled in bearings and is driven to rotate about the shaft axis, the axis of rotation is geometrically determined by the bearings or shaft and is a constrained axis of rotation, not necessarily identical with the free axis. The various known balancing methods serve essentially to determine and minimize any unbalance of the rotor so as to make the constrained axis of rotation as nearly as possible identical with the inertia axis. More specifically, the methods known as "balance centering" serve to first balance a rotor about its axis of rotation so that this axis satisfactorily coincides with the inertia axis, and then to drill a hole on the inertia-center points of the shaft or to otherwise mark the rotor, before subsequently machining the rotor on the same or on another machine about the coincident rotational and inertia axis thus marked. As a rule, for balance-centering purposes, the finished rotor is first mounted in a receiving device or cage journalled for rotation in oscillatorily supported bearings of a balancing machine. The rotor-cage assembly is then driven to rotate. Any unbalance, manifesting itself by oscillations of the bearings, is measured and minimized until during the measuring run, the free and inertia axis are coincident. Thereafter, the rotor is subjected in the same machine to a marking or machining operation by one or more center drills or other tools.

According to the method heretofore prevalent, the just-mentioned balance was obtained by displacing the rotor relative to the previously and individually balanced cage so as to make the free or inertia axis of the rotor coincident with the axis of rotation of the cage. Originally, this displacing of the rotor relative to the cage had to be effected while the machine was at standstill, and the displacement had to be in accordance with an unbalance magnitude previously measured during a measuring run on the same machine. This method achieved its aim only gradually in increments so that much time was required. This was so because in most cases several consecutive displacing operations and just as many testing runs for checking the effect of each individual displacement were necessary. However, in more recent machines the displacement of the rotor is effected during its rotation by motor means that participate in the rotation so that it is not necessary to stop the machine for each step of displacement. A cage assembly, including the displacing motors and mechanisms, all rotating together with the rotor, increases the total rotating mass to a multiple of the rotor mass alone. This affects the balancing accuracy so detrimentally that in many cases the requirements to be met cannot be satisfied despite all efforts and skill. Machines of this kind, therefore, are often applicable only for approximate balancing of raw workpieces, whereas the final balancing of the finished product must be carried out on a separate machine. This involves increased cost for investment, maintenance and labor. Further disadvantages of the described methods and corresponding machines reside in the fact that it is difficult to adapt the centering device to rotors of greatly varying length, and above all that the centering marks can be placed upon the rotor only with the aid of rotating tools while the rotor is at standstill. As a result, any geometric discrepancy between the carefully adjusted rotational axis of the rotor relative to the axis of rotation of the centering tool enters as an error into the balancing accuracy. As an inevitable consequence, the final machining about the marked axis of rotation, serving to finish the rotor, is not entirely free of balancing errors.

It is an object of my invention to minimize or eliminate the above-mentioned shortcomings of the known center balancing and similar machining methods and operations, and to provide a possibility of conducting such operations not only expeditiously, but also with a balancing accuracy and a reliability far greater than heretofore attainable.

To this end, and in accordance with one of the features of my invention, the geometric axis of rotation of a cage, chuck or other rotor-holding means of a balancing machine, is made to register with the inertia (free) axis of the accommodated rotor by imparting a balance-producing displacement to the rotational axis of the holding means with the aid of displacement control devices not participating in the rotational measuring run; whereafter the machining, such as the application of centering marks to the rotor, is effected while the rotor is in rotation about its axis.

The method affords the balance centering of raw as well as partly finished or finished rotors with a heretofore infeasible degree of accuracy because, in the rotating assembly of rotor and holding means, the relative position of holding means and rotor remains fixed so that the driving torque is rigidly and most stiffly transferred to the rotor, and also because the axis of rotation of the assembly can be displaced in lost-motion-free bearings in a sensitive and continuous manner until the measured unbalance vanishes. The unbalance thus to be eliminated is measured with any known balance analyzing devices suitable for this purpose, preferably with the aid of the conventional electric analyzing network and preferably by selecting the displacement planes, i.e. the geometric planes in which the corrective displacement of the axis of rotation is effected, as the reference planes, or "correction planes" of the unbalance measurement. Reference can be had to patent application Serial No. 426,424, filed April 29, 1954, now U.S. Patent No. 2,722,830, and U.S. Patent No. 2,706,399, issued April 19, 1955, for detailed information on electric analyzers suitable for use in conjunction with the present invention.

As mentioned, the marking of the axis of rotation of the rotor, or any other machining of the rotor about this axis, is carried out according to my invention while the rotor is kept in rotation about the axis after it has been determined by the above-described method of the invention.

According to one of the more specific features of the invention, for effecting the above-mentioned corrective displacements of the rotational axis of the assembly, I provide the balance-centering machine with a cam device that has eccentric cam faces coacting with the bearings of the rotatable rotor-holder assembly to permit continuous displacement of these bearings relative to the stationary machine frame structure. More specifically, for securing the desired displacement of the rotor-holder axis accurately free of lost motion, the eccentric cam faces are guided on lunette-type bodies whose semi-spherical surfaces permit these cam faces a self-alignment relative to the bearing faces of the rotating rotor-holder assembly.

According to further features of the invention, the masses of the rotor-holder assembly oscillating together with the rotor to be balanced, are compensated either by means of counteracting masses oscillating in opposition to the holder masses and directly excited by the adjusted eccentricity of the holder assembly, or by electric means which produce compensating electromotive forces adjustable in such a way as to have the indicating instrument show the rotor unbalance only.

There are two fundamental ways of applying the above-described center balancing method according to the invention, the particular way selected depending upon the construction or type of the rotor to be processed.

(1) The Polar Coordinate Measuring and Displacing Method

This method, like the polar methods previously known, requires the use of a phase transmitter, i.e. an alternating current generator such as a sine wave generator, which is connected with the rotor to rotate together therewith for producing two reference voltages 90° displaced relative to each other whose frequency corresponds to that of the rotor revolutions. The angular position of unbalance is determined by rotationally adjusting the stator of the phase transmitter (311 in FIG. 3) and by also actuating the abovementioned displacing device according to the invention. Thereafter, the axis of rotation of the holder-rotor assembly is displaced by the same displacing device in the manner above mentioned and more fully described hereinafter.

A mutual influencing of these two operating steps is prevented by the fact that the eccentricities adjusted by means of the displacing device are placed in registry with the two mutually displaced alternating currents taken from the phase transmitter. That is, one of these two voltages is coordinated with the angular position of the unbalance, whereas the other voltage is coordinated to the magnitude of the unbalance as well as to the eccentricities required for the correction of the unbalance.

According to another feature of the invention, the angular position can be found in a simple manner by adjusting the rotor and simultaneously the stator of the phase-transmitting generator with the aid of a differential gearing relative to the eccentric cam faces of the displacing device until, during the testing run of the rotor-holder assembly, the measuring instrument then connected with the phase transmitter no longer shows an unbalance indicating deflection. The subsequent zeroing of this deflection during the same measuring run, effected by displacing the rotor axis with the aid of the eccentric cam faces of the displacing device, then produces the measure of the unbalance magnitude and hence the amount of the required unbalance compensation. The adjustments required during such a measuring run of a machine designed and operating according to the invention may be limited to turning two displacement control knobs or handles in the direction and by the amount required to set the rotor to the correct machining position.

The application of the polar method is recommended for centering operations in a single correction plane, that is if, for instance, a unilaterally journalled (flying) disc-shaped rotor body is involved (see FIGS. 4 to 5b). The polar method is further of advantage for balancing in two correction planes of a rotor body journalled in two oscillating centering devices (see FIGS. 1a to 3).

(2) The Fixed-Coordinates Method

This measuring and displacing method deals with unbalance compensation relative to two predetermined coordinate planes of the rotor. For this purpose, the invention provides a displacing device that permits performing the displacement of the axis of rotation in two component directions, preferably 90° mutually displaced, the displacement in each direction being independent of that in the other direction. This method possesses several peculiar advantages, namely that the component of displacement can be combined with the component indication, that none of the individual component displacements affects the indications for the other components, and that if desired, the axis of the rotor may be permitted to perform parallel movements as well as tilting and tumbling movements. The method is suitable for single-plane balancing (see FIGS. 16a to 16c) but is particularly well applicable for two-plane cantilever balancing (see FIGS. 6 to 10) because the components for the two planes accurately correspond to each other respectively.

In machines according to the invention, the rotor-holder, when adjusted by displacement of its axis of rotation to establish balance of the assembly, comprises eccentrically located parts whose masses participate in the unbalance oscillations. According to another feature of the invention, this error mass is compensated by a corrected mass which oscillates in opposition to the error mass and whose movement is directly controlled by the adjusted eccentricity of the axis of rotation. However, the compensation may also be effected by electric means, for instance in the form of a counter EMF in the oscillation receiving or measuring instrument.

Other features of the invention, having for their object a fully automatic control of the balance-centering operation of a machine according to the invention, comprise novel controlling instrumentalities (FIGS. 14 and 15) and appertaining novel circuit connections (FIG. 13).

The invention, furthermore, comprises the combination of a machine tool for balancing with one for machining (FIGS. 16a to 16c). These and other objects, advantages and features, the latter being set forth with particularity in the claims annexed hereto, will be apparent from, and will be mentioned in, the following description presented in conjunction with the embodiments shown by way of example on the accompanying drawings. In the drawings:

FIGS. 1a to 5c relate to a balance-centering machine for compensating unbalance according to the polar method by angularly adjusting a phase-position transmitter simultaneously with a spindle of the device for displacing the axis of rotation, FIGS. 1a to 3 applying to a bi-laterally journalled rotor such as a Cardanic shaft and FIGS. 4 and 5a to a unilaterally journalled or "flying" rotor such as a pump rotor. More specifically, FIG. 1a is a schematic front view of the machine seen from the operator's position and serves to present the arrangement of all characteristic components of a balance centering machine for Cardanic shafts according to the invention. FIG. 1b is a schematic circuit diagram for the electric control of the machine. FIGS. 2a to 2f illustrate parts of the axis displacing device according to the invention on a larger scale. FIG. 2a' represents a cross section through the housing 105 taken at the right-hand side of FIG. 2a, and illustrating a ball bearing between the housing and sleeve. FIG. 3 is a lateral view of one of the bearing standards of the machine according to FIG. 1a and also shows the control members located within the standard. FIG. 3a is a detail end view of the differential gearing and worm gear 324 of FIG. 3; FIG. 3b is a diagrammatic detail plan view of the shafts and associated structure for adjusting worm 324 from knob 312.

FIG. 4 is a longitudinal axial section through the axis displacing device of a balance centering machine according to the invention for unilaterally journalled (flying) rotors; FIG. 4a is a diagrammatic representation of the displaceable bearing unit showing the different axes and the effect of displacement of the control spindle; and FIG. 5a is a cross section taken along the line V—V in FIG. 4 in the direction of the arrows.

FIGS. 5b and 5c show a perspective view and a circuit diagram respectively of an example for a generally applicable compensating device for the unbalance correction of the rotating control spindle of the axis displacing device.

FIGS. 6 to 12 relate to an embodiment of a balance centering machine according to the invention operating in accordance with the fixed-coordinates method. FIG. 6 shows a centrifugal balance centering machine by a part sectional front view. FIG. 7a is a section along the line VII—VII in FIGS. 6 and 8. FIG. 8 is a section along the line VIII—VIII in FIG. 7a, but shown on a somewhat larger scale. FIG. 7b shows a special adjusting device. FIGS. 9 and 9a are perspective views on a larger scale, FIG. 9b is an axially sectional view, and FIG. 10 is a perspective view of some of the parts applicable for the machine according to FIGS. 6 and 7a. FIGS. 11, 11a and 12 are explanatory and relate to the axis displacement as occurring when measuring and compensating unbalance in accordance with the fixed-coordinates method.

FIG. 13 shows a schematic circuit diagram for the fully automatic control and operation of a balance centering machine according to the invention, and FIGS. 14 and 15 illustrate a lateral view and front view respectively of a contact device appertaining to the system of FIG. 13.

FIGS. 16a, 16b and 16c illustrate respectively a front view, a lateral view and a detail of a balance centering machine tool.

Figure 1A:
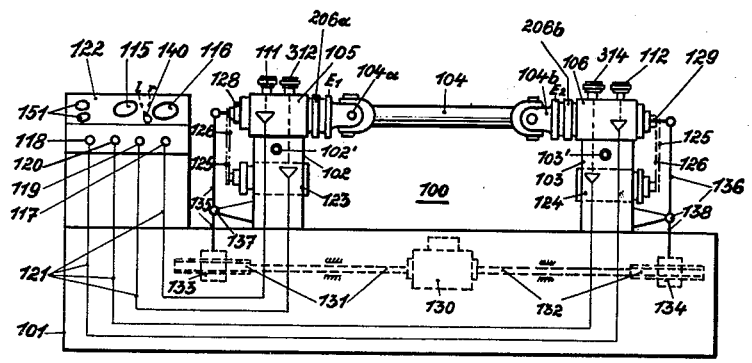

In general, the reference numerals used in the illustrations have three or four digits and are so chosen that the initial digit or digits indicate the figure or group of figures from which a particular part is best apparent.

The balance centering machine 100, according to FIG. 1a, has two bearings standards 102 and 103 mounted on the foundation 101. The two standards enclose parts for the springy journalling of a rotor to be tested, for instance, the Cardanic shaft 104 with its linkage heads 104a and 104b. Mounted on the standards are further the drive motors 310, 310′ (FIGS. 1b, 3) for rotating the rotor to be tested, these motors being preferably located in respective housings 123 and 124. Also located within the standards are phase-transmitters 311, 311′ (FIGS. 1b, 3) which consists of generators of a sinusoidal reference voltage. The machine tools as well as the displacing devices with the aid of which the free inertia axis of the rotor and the axis of rotation of the rotor-holding means are made coincident with each other are mounted in the housings or bearing supports 105 and 106 (FIGS. 1a, 3). The extent of the displacement required for eliminating all unbalance oscillations in the selected reference planes can be accurately determined with any of the unbalance measuring and indicating devices customary in the balancing technique. In the illustrated examples, for instance, the unbalance oscillations are transmitted to permanent-magnet oscillation pickups 102′ and 103′ (FIGS. 1a, 1b, 2a) located on the bearing standards 102 and 103 respectively. For determining and for indicating the amount and angular position of the unbalance, the illustrated machine is shown equipped with wattmeters or similar instruments likewise as known and customary for such purposes. (See U.S. Patent 2,706,399, referred to above.) A wattmeter 115 serves for indicating the magnitude of the unbalance, and a second wattmeter 116 (FIGS. 1a, 1b) for indicating the angular position of the unbalance. The field coils of the wattmeters are supplied with alternating voltage from the two generators 311, 311′ which operate as the phase transmitters (see field coils 115c, 115d and generator 311 in FIG. 3). The moving coils of the two wattmeters are supplied with curernt from the oscillation pickups 102′ and 103′. Each drive motor 310 or 310′ is coupled with one of the phase transmitter generators 311 or 311′ (FIG. 3) to form a single set together therewith, so that the phase transmitting generators run in synchronism with the rotor 104. Each generator produces two sinusoidal reference voltages, 90° phase-displaced from each other, at the frequency of rotor rotation. As will be described below with reference to FIG. 3, the housing and hence the stator of each of the two generator sets is rotatable about the generator axis in order to thereby determine the angular position of unbalance in the known manner.

The above-mentioned displacement of the axis of rotation in accordance with a previously effected indication of unbalance is carried out with the aid of a displacing device on each of the two standards. The two displacing devices are operated manually by knobs 111, 112 (FIGS. 1a, 2a, 3) on the left housing 105 and right housing 106, respectively; or the two displacing devices are placed in operation at a central location by means of switches 117 to 120 or automatically according to FIGS. 13 to 15. For this purpose, remote control means 121 (FIG. 1a), for instance electric leads, flexible shafts or the like, are provided which are connected with the displacing means located in the housings 105, 106. The indicating instruments 115, 116, the control switches 117 to 120, and power switches 151, 151a, 151b, 151c (FIG. 1b) for controlling the drive motors, and a two-position switch 140 (FIGS. 1a, 1b) which adjust the measuring device to the left-hand or right-hand reference plane $E_1$ or $E_2$ of the rotor, are preferably all accommodated within a separate control desk 122 (FIG. 1a). The reference planes $E_1$, $E_2$ extend perpendicularly to the plane of illustration and intersect the rotor at the respective locations denoted by $E_1$ and $E_2$ in FIG. 1a.

Figure 2A:
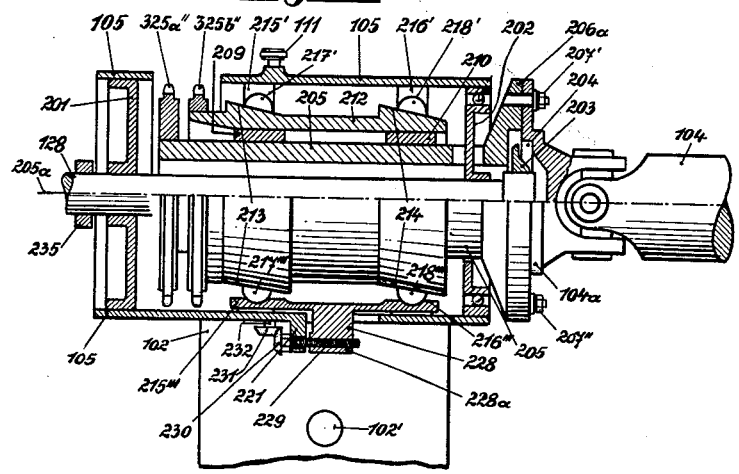

The tools for producing the centering marks or for otherwise machining the heads of the Cardanic shaft 104 are likewise contained in the housings 105 and 106. The axially movable spindles or holders 128 and 129 for these tools project out of the respective housings (FIGS. 1a, 2a, 3).

The rotor drive motors 310, 310′, each together with a differential gearing 320 (FIG. 3) are mounted within the housings 123 and 124 on the bearing standards 102, 103 respectively. The driving torque is transmitted to the rotor-holding device 205–206a and thus onto the rotor 104 by means of a sprocket chain transmission 125 (FIGS. 1a, 3). The forward and reverse feed of the two centering tools is effected by means of a motor 130 (FIG. 1a) located within the machine base 101. Motor 130 acts upon the tools with the aid of threaded spindles 131, 132 (FIGS. 1a, 3) engaged by threaded nuts 133 and 134 which are connected with double-armed levers 135 and 136 respectively. The levers have a fixed pivot point 137 or 138 on the respective bearing standards and extend upwardly to the tool holders 128 and 129 respectively. Revolution of the screw spindles 131 and 132 causes the upper ends of the levers 135 and 136 to move uniformly inwardly, that is toward each other, or in the opposite direction, thus causing the tools to move toward or away from the linkage heads of the Cardanic shaft 104.

Two handles or knobs 312 and 314 (FIGS. 1a, 3) form part of devices with the aid of which the position of the rotor being tested can be adjusted relative to the axis displacing means as will be described below. The rotor-holding means comprise two flanges 206a and 206b which receive the Cardanic shaft heads 104a and 104b respectively.

Figure 1B:
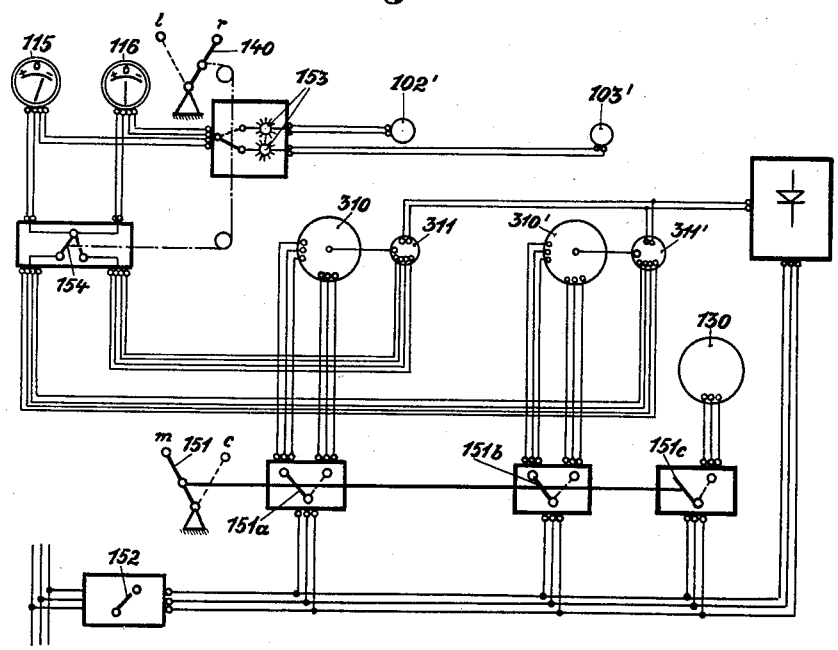

According to the circuit diagram of FIG. 1b, the measuring and indication of rotor unbalance is carried out by means of an electric network 153. Such a network is generally known and is in most cases employed on industrial and commercially available balancing machines. For that reason, the details of such an analyzing network are not illustrated or described in this specification. When the switch 151 and its component switches 151a, 151b and 151c are placed in the measuring position m, and when the main power switch 152 is closed so that the rotor drive motors 310, 310′ together with the respective phase transmitting generators 311, 311′ are energized from the current supply line, then the rotor 104 to be tested will run at a high speed of rotation (speed of normal operation).

The machine is now ready for the measuring runs. The unbalance analysis is effected sequentially in the predetermined reference planes $E_1$ and $E_2$ (FIG. 1a) of the Cardanic shaft heads 104a and 104b, respectively; that is, the unbalance is measured for each individual reference plane in two mutually perpendicular coordinate directions. At first, the measuring device is set for the left plane $E_1$. For this purpose, the switch 140 (FIG. 1b) is turned to the left-hand position $l$ (indicated by a broken line). As a result, the two voltages generated in the two pick-ups 102′ and 103′ can operate in the proper proportions through the electric network 153 onto the moving coils (not illustrated) in the respective wattmeters 115, 116 in such a manner that the unbalance oscillations occurring in the right reference plane $E_2$ have no influence upon the measuring result derived from the unbalance oscillations in the left reference plane $E_1$. With the just-mentioned setting of switch 140, the switch 154 is simultaneously so placed that the voltage generated by the left phase transmitting generator 311 is supplied to the field coils (likewise not illustrated) of both wattmeters in such a manner that the wattmeter 115 receives the voltage corresponding to the vertical unbalance component whereas the wattmeter 116 receives the voltage corresponding to the horizontal unbalance component.

For measuring unbalance in the other reference plane $E_2$, the switch 140 is moved to the right position $r$. As a result, the system is set for analogous operation with reference to plane $E_2$. Now the phase transmitter 311′ supplies its voltages to the wattmeters 115, 116.

When in the different measuring positions and settings of the system, the indication of the wattmeter 116 is turned to zero with the aid of the axis displacing devices according to the invention and still to be described with reference to FIG. 3, then the wattmeter 115 indicates the magnitude of unbalance in the selected coordinate measuring direction. This indicated unbalance magnitude represents the amount of displacement required for the axis of rotation 205a (FIGS. 2a, 2b) of the rotor-holder shaft 205, which displacement will cause this indication to vanish. When in this manner, the indications for all measuring directions have been made to disappear, then the free or inertia axis of the rotor is coincident with the axis of rotation for the combined rotor-holder shaft and a rotor as a unit. The correct machining position for the rotor is thus attained. This latter axis of rotation of the combined rotor-holder shaft and rotor is not necessarily the central axis of shaft 205 per se, but is the axis of rotation for the combined rotor-holder shaft and rotor as a unit and is, after balancing, coincident with the axis of the tool holder 128 about which the central axis 412c or 212c of spindle 412 or 212 rotates in its displaced position necessary to achieve the balance condition. For performing the centering work or machining operation, the switch 151 (FIG. 1b) can now be placed to the centering position $c$. This supplies current to the drive motor 130 (FIGS. 1a, 1b) for the marking tools, and the rotor drive motors 310, 310′ are automatically switched to a lower speed of rotor rotation suitable for the marking operation.

FIG. 2a shows on a larger scale a side view, partly in section, of the left Cardanic shaft head 104a, its coupling with the drive shaft 205 of the rotor-holding device, the appertaining machining tool 203, and the axis displacing means for the head, the latter means being disposed within the housing 105. The tool-holder spindle 128 is surrounded by the hollow drive shaft 205 of the rotor holder. On the side facing the rotor to be tested, the hollow shaft 205 carries the receiving flange 206a to which the Cardanic shaft head 104a is secured by means of several screws 207′, 207″. The coupling between the drive shaft 205 of the holding device and the rotor 104 is completely rigid or stiff as far as the transmission of torque is concerned. Located on the side opposite the rotor is a sprocket wheel 325a″ which is driven by the sprocket chain 125 (see FIGS. 1a and 3). Two ring-shaped sleeves 209 and 210 are provided for journalling the hollow shaft 205 within a cam spindle 212 of the displacing device. In the illustrated example, the marking of the rotor is effected by turning a centering face 204 into the shaft head with the aid of a cutting tool 203 mounted on the tool holder spindle 128 which is axially displaceable with respect to guiding sleeves 201 and 202 which are rotatable within ball bearings in the housing 105 (FIG. 2a′). The tool holder spindle 128 is moved into and out of the working position by means of the above-described linkage actuated by motor 130. The tool holder 128 rotates together with the hollow driving shaft 205, but the latter is radially displaceable with respect to the former. However, sleeve member 201 may be nonrotatable with respect to the immovable housing 105.

For the processing of rotors not involving a Cardanic joint, for instance crank shafts, the rotor-receiving parts on flange 206a are preferably given an articulate design. An example of this kind is illustrated in FIG. 2b. The end of the rotor specimen 104′ is hung, by means of a clamping head 208, into a Cardanic linking device 220 on flange 206a. Otherwise the specimen holding means in this example are similar to those illustrated in FIG. 2a. The specimen 104′ is given a centering hole 204′ with the aid of a non-rotating drill or cutting tool 203′, corresponding to the drill 721 shown in FIG. 7a.

Figure 5A:
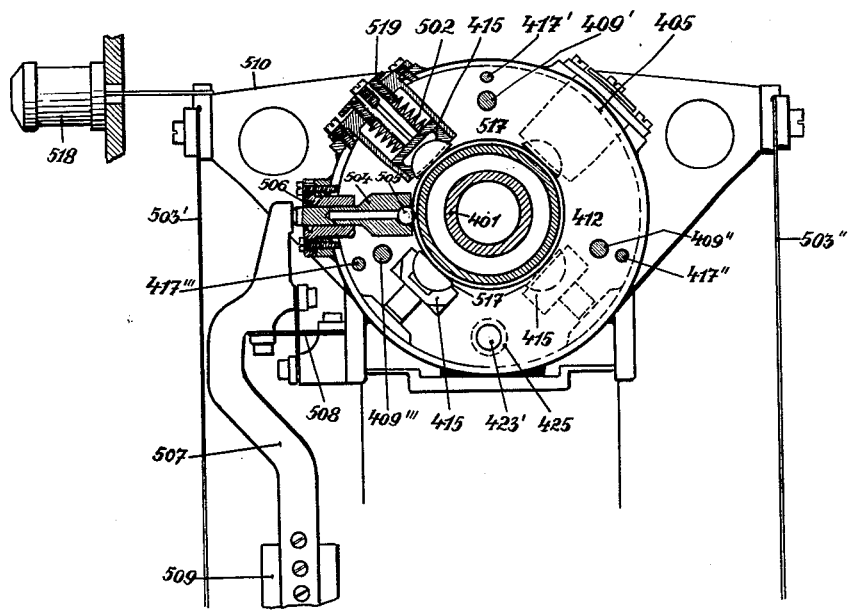

The above-mentioned hollow spindle 212 forms part of the device which according to the invention serves to displace the inertia axis of the rotor so as to make it coincident with the axis of rotation which in the balanced condition then coincides with the axis of tool holder 128. Tool holder 128 does not participate in the rotational movement of the rotor. The hollow spindle 212 is provided with two eccentric surface portions or cam areas 213, 214. In the embodiment according to FIG. 2a, these two cam faces are designed as respective shoulder portions of the spindle 212 and both have the shape of circular cylinders whose respective axes have an inclined position relative to the spindle axis. The two cylinders have the same diameters, the same height and the same angle of inclination. Each eccentric cam face of the hollow displacement control spindle 212 is preferably located in four lunette-type guiding bodies uniformly distributed over the circumference of the cam face. The guiding bodies comprise semi-spheres 217′, 217″″ and 218′, 218″″ located in respective pans 215′, 215″″ and 216′, 216″″. While only the guide bodies 215′, 216′ and 215‴, 216‴ as well as the semi-spheres 217′, 218′ and 217‴, 218‴ are visible in FIG. 2a, it will be understood that the semi-spheres or lunettes and the corresponding pans at each cam area are arranged in two pairs in the same manner as shown in FIG. 5a for the lunette pans denoted by 415. Each two pairs of lunette-type guides on the right and on the left side, in the illustrated example (FIG. 2a) the two upper guides 215′ and the two guides 218′ are mounted in fixed relation to the housing 105. The remaining pairs are axially displaceable in the housing 105. Consequently, the axis displacing device does not participate in the measuring run of the specimen rotor, but remains stationary with the exception of the adjusting movement in the axial direction which amounts to only a few millimeters. For this purpose, the pans 215″″ and 216″″ are arranged on a slider 228 which is axially displaceable along the inner wall of the housing 105. Displacement of the slider is effected by means of a screw spindle 229. This spindle is in threaded engagement with a lug 228a of the slider and is revolvably mounted in a lug 221 of housing 105 which forms a fixed bearing. Bevel gears 231 and a shaft 232 form a connection between the adjusting spindle 229 and the adjusting knob 111, with the aid of which the adjustment of the slider 228 can be conveniently and accurately effected. The cam control spindle 212 of the displacing device carries on its left-hand end the sprocket gear 325b″ of the chain transmission 126 according to FIGS. 1a and 3. With the aid of this transmission, the cam control spindle 212, as will be described with reference to FIG. 3, can be turned about its longitudinal axis on the sleeves 209, 210 (FIG. 2a).

Figures 2E, 2F:
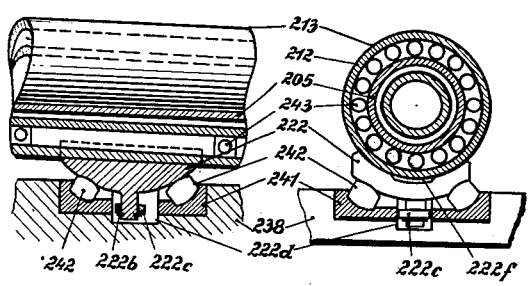
Figure 2B:
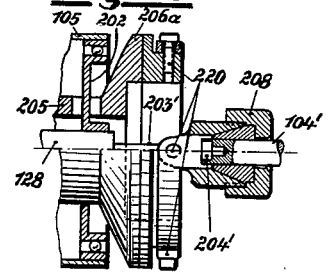
Figures 2C, 2D:
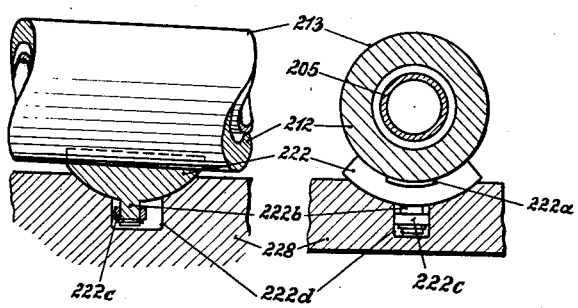

FIGS. 2c and 2d each show on a larger scale a side view and a cross section respectively of a somewhat modified lunette-type guide which, in contrast to the embodiment of FIG. 2a, possesses relatively large gliding surfaces, thus affording the advantage of reduced wear and a more reliable guidance of the cam face spindle. The slanting cylinder portion 213 of the spindle 212 rests in a lunette 222 whose guiding face is adapted to the exterior surface of the slanting cylinder and may be provided with an oil groove 222a. For security of mounting, these lunettes are guided by means of lugs 222b in a guiding slot 222d either of the displaceable slider 223 and are made easily movable by providing a roller 222c on the lug 222b. The upper lunettes, such as those denoted by 217' and 218' in FIG. 2a, may be mounted in the same manner within guiding slots corresponding to slot 222d in FIGS. 2c, 2d, but located in the respective fixed holders 215' and 216' respectively.

According to the modified embodiment shown in FIGS. 2e and 2f, in a partly sectional view and in cross section respectively, similar lunettes 222 are supported on barrel-shaped rolling bodies 242 within a cage 241; and ball bearings 243 are provided between the lunettes and the cam face spindle for further reducing the friction and permitting a fine adjustment of utmost sensitivity. Otherwise, the mounting corresponds to that described above with reference to FIGS. 2c and 2d.

The lunette-type guiding devices have the advantage of journalling the cam face spindle 212 of the displacing device completely free of lost motion. Consequently, the possibility of any movement in the bearings during the measuring and machining run, which may detrimentally affect the balancing accuracy, is completely eliminated.

FIG. 3 shows the left-hand bearing standard 102 according to FIG. 1a on a larger scale and partly in section in order to show details of the driving members housed within the standard. The standard 102 rests upon the machine base 101 to which it is fastened by bolts 301. Two vertical leaf springs 303' and 303", located one behind the other as viewed in FIG. 3 and corresponding to the leaf springs 503' and 503" shown in FIG. 5a, are firmly secured to the standard by means of screws 304' (FIG. 3). The leaf springs support the housing 105 so as to permit horizontal oscillations of the housing perpendicular to the plane of illustration, hence toward and away from the observer, while rigidly holding the housing in the vertical direction. The housing 105 is joined with the leaf springs by means of screws 305'. As in FIGS. 1a and 2a, the tool spindle is denoted by 128, and the coupling flange for the rotor to be tested is denoted by 206a. The described axis displacing means can be actuated from the control desk 122 (FIG. 1a), or automatically, or by means of the knob or handle 111 (FIG. 3). Located between the springs 303' and 303" of the bearing standard is the driving unit which comprises the motor 310 and the phase-transmitter 311 coupled with the motor, as well as the differential gearing 320. Denoted by 135 is the double-armed lever according to FIG. 1a. As explained, the lever 135 is turned about its pivot 137 by displacement of the nut 133 relative to the screw spindle 131 with the effect of shifting the tool holding spindle 128 axially inwardly or outwardly.

The take-off shaft 310b of the differential gearing 320 is journalled in two axially spaced places and carries on its free, projecting end the sprocket gear 325a' for the chain transmission 125 which connects the shaft 310b with the upper sprocket 325a" and thus with shaft 205 (FIG. 2a) and rotor-receiving flange 206a.

The differential gearing 320 serves to place a measured angular unbalance position of the rotor, for instance of Cardanic shaft 104, in registry with the measuring component indicated by one of the two wattmeter instruments 115 or 116. This is done by turning the rotor to be tested as well as the housing of the phase-transmitter generator 311 (FIG. 3) relative to the control spindle 212 (FIG. 2a) of the displacing device. This adjustment is carried out by turning the knob 312 (FIGS. 3, 3a, 3b) in one or the other direction. The rotation of knob 312 is transmitted by a shaft 306 and a bevel gear 306a to a bevel gear 322a on an auxiliary shaft 321 which carries two further bevel gears 322b and 322c. Bevel gear 322d acts through a bevel gear upon a shaft 322f which carries a worm meshing with a worm gear 324 of the differential gearing 320. As a result, the rotary displacement of knob 312 is transmitted to the worm gear 324 of the differential gearing.

Mounted between the shaft 310a of the drive motor 310 and the differential gearing 320 is a transmission composed of three spur gears 310c, which compensates the reversal in rotation initiated from the differential gearing. The differential gearing comprises a driving pinion 326 loosely fitted on the shaft 310b, and a take-off pinion 328 which is coupled with the sprocket gear 325b. The differential gearing further comprises a gear 327 which is revolvably mounted in the housing of the differential gearing and in mesh with the driving and take-off pinions. Pinion 326 is driven from the motor shaft 310a through the transmission gearing 315. The bevel gear 322c controls the angular displacement of the rotatable stator of the phase transmitter 311 through shaft 322e and worm 322d'. The take-off pinion 328 imparts rotation to the sprocket gear 325b' and, by means of the chain 126, also to the sprocket gear 325b" on the cam face spindle 212 (FIG. 2a) of the displacing device. The rotation thus imparted to the displacement control spindle 212 occurs in a direction depending upon the adjustment of the worm gear 324 (FIG. 3) effected by the operation of the control knob 312 (FIGS. 3a, 3b). This direction of spindle rotation is such that the peak of the eccentric control faces 213, 214 on the spindle 212 (FIG. 2a) can be given a leading or lagging setting relative to the measured angular position of unbalance in the rotor 104 driven by the drive shaft 205. Simultaneously and in the same direction and degree, the stator of the phase transmitter 311 is turned so that the said peak points remain in the component direction. The just-mentioned peaks of the displacement controlling cam faces are their highest points above the geometric axis of rotation 205a (FIG. 2a) of all rotating parts.

The bearing standards 102 and 103 (FIG. 1a) as well as the parts housed therein are accurately similar to each other. That is, the right-hand bearing standard 103 is symmetrical to the above-described bearing standard 102. The operating knob 112 of standard 103 corresponds to the knob 111 of standard 102, and knob 314 corresponds to knob 312.

While the functioning of the machine during a balance-centering operation is essentially apparent from the foregoing description, a summarizing example of a complete machine operation will now be given.

The rotor specimen 104 (FIG. 1a) to be center balanced is first inserted and firmly mounted between the receiving flanges 206a, 206b of the bearing standards 102 and 103, respectively, of which at least one may be displaceable relative to the machine base in order to adapt the machine to specimens of different length. After the rotor 104 is properly mounted, the switch 151 (FIGS. 1a, 1b) is placed into the position $m$ for measuring.

In FIG. 1a, the switch 151 is shown as having two push-buttons to be selectively depressed depending upon whether the setting $m$ or $c$ is desired, whereas in FIG. 1b, for simplicity, the same switch is shown as a lever to be set to position $m$ or $c$. When switch 151 is set to $m$, its associated component switches 151a and 151b energize the respective terminal groups T$m$ of the two motors 310 and 310'. These motors are two-speed A.-C. motors. Accordingly, each has another group of terminals Tc which is energized when switch 151 is in position c and then causes the motor to run at reduced speed.

Consequently, the switch 151, when in position m, causes the drive motors 310 and 310′ to run at high speed. Assuming that the rotor is not balanced, the oscillation pick-ups 102′, 103′ located at the oscillating rotor bearings will now produce unbalance-responsive voltages. Since the phase-transmitting generators 311 and 311′ are joined with the left and right drive motors 310, 310′ respectively, they are also in operation and generate sinusoidal phase-reference voltages. The pick-up voltages and the phase-reference voltages act upon the wattmeter 115 for measuring the unbalance magnitude and upon the wattmeter 116 for measuring the angular position of unbalance. Hence, the electric unbalance measuring device is now in operative condition.

Assume that the switch 140 is first placed into the position r as shown by the full line in FIG. 1b. With this setting of switch 140, the system will now operate to indicate any unbalance in the right-hand reference plane $E_2$. If there is an unbalance in this reference plane, the pick-ups are excited. The pick-up voltages generated at the right bearing standard are applied to the moving coils of the wattmeters. Simultaneously, the two mutually phase-displaced voltages generated by the phase transmitter 311′ are applied as excitation to the field coils of the respective wattmeters for providing the respective vertical and the horizontal measuring components. As a result, the pointers of the wattmeters 115 and 116 (FIG. 1b) are deflected from the zero position.

Next the displacing mechanism for the differential gearing 320 (FIG. 3) is actuated by turning the control knob 314 (FIG. 1a) on housing 106 or operating the switch 120 on the control desk 122. This is done in the sense and by the amount required to return the point of deflection of wattmeter 116 back to zero. The control knob 314 on the right-hand standard corresponds exactly to the control knob 312 on the left-hand standard. As explained above with reference to FIG. 3, the actuation of this knob is transmitted to the differential gearing 320 with the effect of rotationally displacing the peaks of the eccentric bearing faces 213, 214 (FIG. 2). As a result of such displacement, the pointer deflection of wattmeter 116 is zeroed. That is, the operator simply turns the knob 314 in the direction and by the amount required to return the pointer of wattmeter 115 back to zero. When this is done, the bearing faces 213, 214 are turned to an angular position of eccentricity that corresponds to the angular position of rotor unbalance measured by the wattmeter 116.

Thereafter, the control knob 112 (FIG. 1a) is turned by the operator while observing the deflection of the wattmeter 115. Knob 112 corresponds to knob 111 shown in FIG. 2a for the left-hand standard. Correspondingly, the actuation of knob 112 causes the mechanism 228 (FIG. 2a) to axially displace the bearings for the spindle 212 thereby shifting the axis of revolution of the rotor-holder assembly into coincidence with the inertia axis of the rotor. The same adjustment can also be made by operating the control switch 118 (FIG. 1a) at the control desk.

The same two adjustments are then made, during one and the same run of the rotor, for the oscillations occurring at the left bearing standard 102 with reference to the left-hand reference plane $E_1$. To this end, the switch 140 (FIGS. 1a, 1b) is placed in position l, and thereafter the knob 312 (FIGS. 1a, 3) on housing 105 or the corresponding switch 119 is actuated until the wattmeter 116 is zeroed. Subsequently, the knob 111 or the corresponding switch 117 is operated until the deflection of wattmeter 115 is likewise returned to zero. When these four adjustments are completed, the axis of rotation and the inertia axis of the specimen are coincident.

Now the centering or other machining of the rotor may be commenced. At first the switch 151 (FIG. 1b) is switched to the centering position c. This causes the drive motors 310, 310′ to be energized at terminal groups Tc so that they reduce the rotor speed to the desired machining speed. Simultaneously, the motor 130 (FIGS. 1a, 1b) is energized by component switch 151c (FIG. 1b) and displaces the travelling nuts 133, 134 (FIGS. 1a, 3) which shift the respective levers 135 and 136 so that the tool 203 (FIG. 2a) machines a groove 204 into the rotor, or the drilling tool 203′ (FIG. 2b) mounted on the tool spindle 128 machines the centering ring 204′ until, for instance by an adjustable stop 235 at the left end of the spindle 128, the return movement of the tool is automatically initiated in any desired manner and the machine 100 is stopped. Thereafter the machined rotor 104 can be removed from the machine and is accurately balance centered or accurately machined about its inertia axis.

Figure 4:
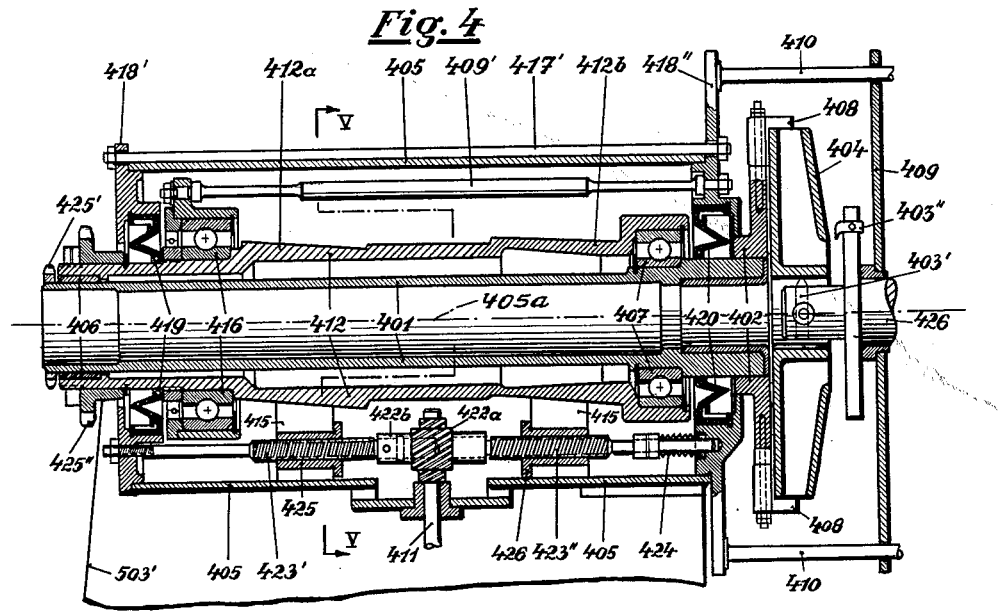

FIGS. 4 and 5a illustrate the axis displacing mechanism and the rotor receiving device of a balance centering machine according to the invention particularly designed for applying the polar balancing method to a unilaterally journalled or "flying" rotor, for instance a disc-shaped pump rotor. In principle, the axis displacing mechanism is similar to that described above with reference to the machine according to FIGS. 1a to 3.

Mounted on a hollow shaft 401 by means of a sleeve bearing 406 and a ball bearing 407 is the hollow control spindle 412 with two axially spaced bearing faces 412a and 412b which, similar to FIG. 2a, are formed as shoulder sections in the shape of circular cylinders whose respective axes are inclined relative to the axis of spindle 412 in parallel relation to each other. The shaft 401 carries on its right end the receiving flange 402 designed as a chuck with clamping claws 408 for securely attaching the rotor here illustrated as the rotor 404 of a pump. An approximately cylindrical shell 405 together with lateral walls 418′, 418″ and appertaining flexible oil seals 419, 420 form together a tight housing whose parts are firmly secured together with the aid of three tensioning bolts 417′ to 417′′′. This housing encloses the shaft 401 and the control spindle 412 from the rotor receiving flange 402 on the right side to the chain sprocket 425″ at the left end, so that the shaft 401 and the spindle 412 can run within an oil bath. A ring-shaped inner race 416 of a ball bearing, held in position by means of spring rods 409′ to 409′′′ of circular cross section, receives the axial pressure of the displacement control spindle 412. The spring rods are secured to the right-hand side wall 418″ of the oil-filled housing.

On its extreme left-hand end the hollow shaft 401 carries the driving chain sprocket 425′. This sprocket serves to drive the shaft 401, similar to the shaft 205 in the machine according to FIGS. 1a, 2a and 3, from a drive motor (not illustrated in FIGS. 4, 5a) at the operating speed or at the machining speed as explained above with reference to FIG. 1b. The embodiment according to FIGS. 4 and 5a is further equipped with a differential gearing 320 according to FIGS. 3, 3a and 3b which comprises the same displacement and operating mechanisms as described above (but not shown in FIGS. 4, 5a). These mechanisms permit adjusting the peaks of the displacement control faces 412a and 412b to the measured angular position of the unbalance of the rotor 404 in the same manner as described above with reference to FIGS. 1a, 2a, 3. The oil-filled housing of which the shell 405 forms part is mounted between two bridge structures 510 which are supported by leaf springs 503′ and 503″ on the machine base (not illustrated in FIGS. 4, 5a) and which perform horizontal oscillations during the rotation of an unbalance rotor 404.

The apparatus is equipped with eight lunette-type guiding units 415 for journalling the control spindle 412 at the displacement faces 412a and 412b. Four of these eight lunette units are adjustable by means of a control shaft 411 located within the lower portion of the housing shell 405. Shaft 411 can be turned by means of a knob (not shown) and transmits its revolution through a worm onto a worm gear 422a mounted on a horizontal rod 422b which is joined or provided with two co-axial screw spindles 423' and 423" engaged by respective travelling nuts 425 and 426. A spring member 424 is disposed between the right-hand end of the screw spindle assembly and the side wall 418" in order to eliminate lost motion in the axial direction of the screw spindle assembly. When the control shaft 411 is being turned, the travelling nuts 425 and 426 and the lunette holders 415 attached thereto move in accurate symmetry in the inward or outward directions along the screw spindles 423' and 423" respectively. As a result, the lower lunette proper moving along the appertaining spindle faces 412a and 412b shift the latter upwardly or downwardly depending upon the direction of revolution of control shaft 411. The semi-spherical bodies 517 are forced against the respective spindle faces by springs 502 whose tension is adjustable by means of set-screw nipples 519.

The eccentric mass of the displacement control spindles 412 with its eccentric displacement faces 412a and 412b can be compensated by means of one or several pendulum devices. The apparatus according to FIGS. 4 and 5a is equipped with a single pendulum 507 for the purpose of such mass compensation. The pendulum 507 is suspended from the oscillating bearing bridges 510 by means of a cross-spring mounting 508. The upper end of pendulum 507 carries a feeler 504 with a feeler ball 505 which rests against one of the faces 412a or 412b of the displacement control spindle 412. Each feeler is axially movable in an oil-tight guide 506 extending through an opening in the wall of the housing shell 405. Each feeler receives the radial movement of the spindle 412 caused by the eccentricity of its respective displacement face 412a and 412b and transmits these movements to its corresponding pendulum 507. The pendulum 107 carries a weight 509 which compensates by counteracting oscillations the unbalance effect of the displacement faces. As a result, these unbalance effects are made ineffective with respect to the unbalance oscillations of the bridge structure 510 and of the oscillation pick-up 518 connected with that structure.

The center marking or other machining is effected while the rotor 404 is rotating, with the aid of one or more tools, for instance milling cutters or lathe cutting tools, as shown at 403' and 403". The tools are mounted on an axially movable tool feed spindle 426 which can be operated manually or automatically. The tool feed spindle 426 is guided by means of a disc 409 slidably engageable with guiding rods 410. The amount of machining work is to be in accordance with the magnitude of the point of deflection in the wattmeter previously determined during the unbalance measuring run as described above with reference to the machine according to FIG. 1a.

A balance-centering operation on a machine according to FIGS. 4 and 5a occurs as follows. After the rotor 404 is properly inserted into the machine, it is placed in rotation at the operating speed by driving the sprocket gears 425' and 425" and thereby the hollow shaft 401 with the receiving flange 402 and the rotor 404, as well as the displacement control spindle 412. The sprockets 425' and 425" are driven through transmission chains from a motor corresponding to that denoted by 310 in FIG. 3. Whether, during rotation, the bearing bridges 510 perform oscillatory movements depends entirely upon the adjustment of the lunette guiding devices 415, 417. As a rule, as long as the axis of rotation of the shaft 401 and hence the axis of the rotor is not yet adjusted by means of the lunette devices and displacements faces 412a, 412b to obtain coincidence of rotational axis and inertia axis, the rotation will cause the bearing bridge structure 510 to oscillate so that a deflection of the wattmeter or other measuring instrument will be observed. The differential gearing 320 described with reference to FIG. 3, 3a and 3b then permits adjusting the peaks of the displacement faces during simultaneous revolution of the shaft 401 and of the displacement control spindle 412. That is, when the machine operator observes such a deflection, he turns the control shaft 411 in the direction and by the amount needed to eliminate the deflection. The rotary movement of the control shaft 411 operates the worm gearing 422a, 422b and rotates the screw spindles 423' and 423" so that the travelling nuts 425, 426 are displaced and adjust the displaceable lunettes. In this manner, the axis of rotation and the inertia axis of the rotor mounted on the shaft 401 of the receiving device are brought into coincidence with each other. When this condition is attained, the tool feed (not shown) is placed in operation. The tools 403' and 403" on the tool feed spindle 426 are moved toward the rotor 404 to concentrically machine the rotor, for instance by machining a central bore and a concentric seat for a sealing gasket, as illustrated. When the machining operation is completed and the rotor is removed from the machine, it is balanced about the machined surfaces and when subsequently placed into use will run quietly without unbalance.

FIG. 4a represents a view of the control-face carrier spindle 412 (212) with the middle or central axis 412c. This axis is intersected in the middle of the control faces 412a and 412b (or 213, 214) by the respective control-face axes $412a_c$ and $412b_c$. When the supporting points at the lunette guide 415 are oriented in accordance with the above-mentioned points of intersection, then the axis 412c rotates quietly in balanced condition. However, when the lunette guide 415 is displaced in the position I, that is, toward the left, then the axis 412c rotates with the eccentricity $e_I$ about the axis of rotation 405a (or 205a) of the holder 402. The latter axis corresponds to axis 405a in FIG. 4 and 205a in FIG. 2. When the guides 415 are displaced in position II, that is, toward the right, then the axis 412c rotates eccentrically displaced by the amount $e_{II}$. The excenter peak points of positions I and II are 180° displaced from each other.

While in the embodiment of FIGS. 4 and 5a, the unbalance inherent in the displacement control spindle due to the eccentricity of its displacement faces is compensated mechanically by a pendulum device, such a compensation can also be achieved electrically. An embodiment of the latter type is illustrated in FIGS. 5b and 5c and may be used in conjunction with all machines according to the invention instead of the mechanical compensating means described above.

Figure 5B:
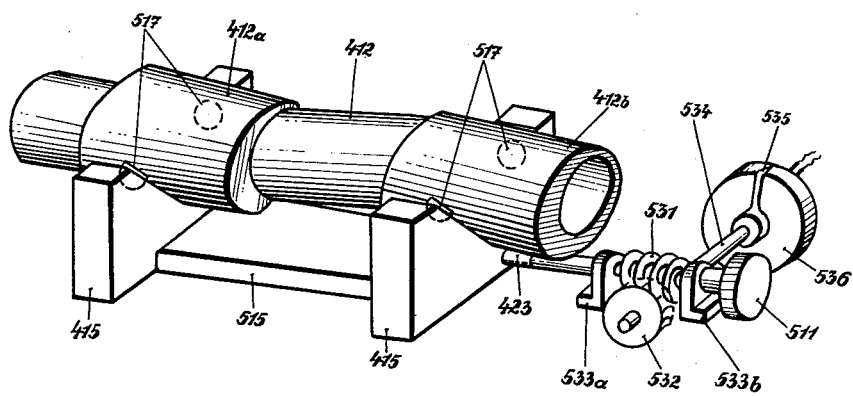
Figure 5C:
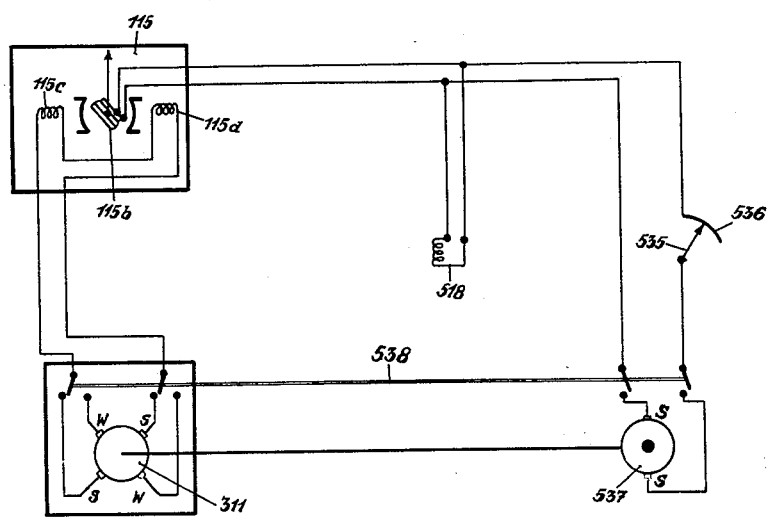

According to FIG. 5b, the displaceable lunette slider 515 can be shifted along the displacement faces 412a and 412b of the displacement control spindle 412 by turning a screw spindle 423 with the aid of a knurled knob 511. As described, the displacement of the lunettes is carried out in the direction and to the extent required to achieve the desired displacement of the axis of rotation. The screw spindle 423 is journaled in brackets 533a and 533b. The spindle 423 carries a worm 531 engaged by a worm gear 532 mounted on a shaft 534. When turning the knob 511, the shaft 534 and the movable contact arm 535 of a rheostat 536 are displaced accordingly. The rheostat 536 is connected in parallel with the circuit of the oscillation pick-up 518 on the bearing bridge structure 510. That is, rheostat 536 lies in parallel relation to the moving coil 115b of the measuring instrument 115. Depending upon the selected position of the switch 538, the field coils 115c, 115d of the measuring instrument 115 are connected either with the horizontal measuring component W or, as illustrated, with the vertical measuring component S of the phase transmitting generator 311. For the purpose of the intended electric compensations, the counter-voltage can be taken either from the phase transmitter itself or from a separate generator 537 which is coupled with the phase transmitter 311 to run in synchronism therewith. When the stator of the phase transmitter 311, as described above with reference to FIG. 3, is adjusted together with the differential gearing by actuation of the knob 312 so that, for instance, the horizontal component does not produce a deflection in wattmeter 115, then the switch 538 is set to the vertical component S, whereby simultaneously the generator 537 is connected in the moving-coil circuit. With this connection, the generator supplies a counter-voltage to the moving coil which is determined by the adjusted resistance of the rheostat 536 and which accurately corresponds to the adjustment of the lunettes. That is, this voltage increases or decreases dependent upon whether the lunettes are moved upwardly or downwardly along their displacement faces 412a, 412b. This has the result that the indication of the wattmeter corresponds only to the true unbalance resulting from the discrepancy between the inertia axis and the rotational axis of the rotor, but does not indicate the oscillatory deflections stemming from the eccentricity of the displacement control spindle.

In the manufacture of some products, it is desired to subject the workpiece to such a balance-centering operation that the product, upon completion of this operation, retains an accurately predetermined unbalance of such location and magnitude that it will vanish automatically as a result of a subsequent finishing operation. Such a method is described in my copending application Serial No. 268,156, filed January 25, 1952 and assigned to the assignee of the present invention. This method of centermarking or machining a workpiece so as to retain a residual corrective unbalance moment that is to disappear when a predetermined zone of the workpiece is subsequently finished, can readily be carried out with machines according to the present invention. For such purposes, it is only necessary to correspondingly dimension the pendulous weight 509 (FIG. 5a) or to give the rheostat 536 (FIGS. 5b, 5c) a corresponding control characteristic. The method of retaining a predetermined unbalance moment can thus also be performed with the advantage, afforded by the present invention, of avoiding the provision of unbalance adjusting means that must rotate together with the workpiece.

The above-described embodiments according to FIGS. 1a to 5c represent examples of balance-centering machines in which the specimen rotor is held in one or more oscillating bearings and in which the rotation axis of the rotor-holding device is placed into registry with the inertia axis of the rotor by means of a gliding movement. In contrast thereto, the illustrations in FIGS. 6 to 10 relate to machines for performing the method according to the invention, in which the rotor-receiving device permits the rotor to perform not only parallel, but also tumbling movements. In the latter machines, the unbalance can be analyzed in each of two axially spaced planes of the rotor with reference to two coordinate directions which, in practice, are preferably perpendicular to each other and which in the following are briefly called the vertical component direction S and the horizontal component direction W. As an example of this type of machinery, the illustrations show a machine with a vertical rotor receiving shaft applicable, among other things, for the balancing and center drilling of centrifuge rotors. However, whether the rotor receiving shaft is given a vertical or horizontal position is not essential to the invention proper.

The component mechanisms of the machine are mounted within a housing 606 (FIG. 6) and within the machine base 607, whereas the measuring and indicating devices and the actuating members for the control of the machine are located within the housing of a control desk 622. Mounted on the housing of control desk 622 is a wattmeter 615 which indicates the magnitude of the "vertical" unbalance component of the workpiece 604.

As second wattmeter 616 also mounted on the desk housing 622 indicates the "horizontal" unbalance component relative to an upper reference plane $E_1$ of the rotor workpiece. The terms "vertical" and "horizontal" are used to denote the two coordinate directions, rotating with the rotor, in each of the two horizontal reference planes $E_1$ and $E_2$. When placing a switch 640 to a different position, the two wattmeters indicate the unbalance components with reference to a lower reference plane $E_2$ of the rotor. The remote control switches 618 and 620 of the control desk 622 serve to control the adjustment of the displacement faces of the axis displacing device and are coordinated to the upper reference plane $E_1$. The switches 619 and 617, serving also the purpose of controlling the axis displacing device, are correlated to the lower reference plane $E_2$. Also mounted on the control desk 622 are the power control switches 609 and 610 serving to turn the machine on and off. The circuit diagram of this control system is similar to that shown in FIG. 1b and described above.

Figure 7A:
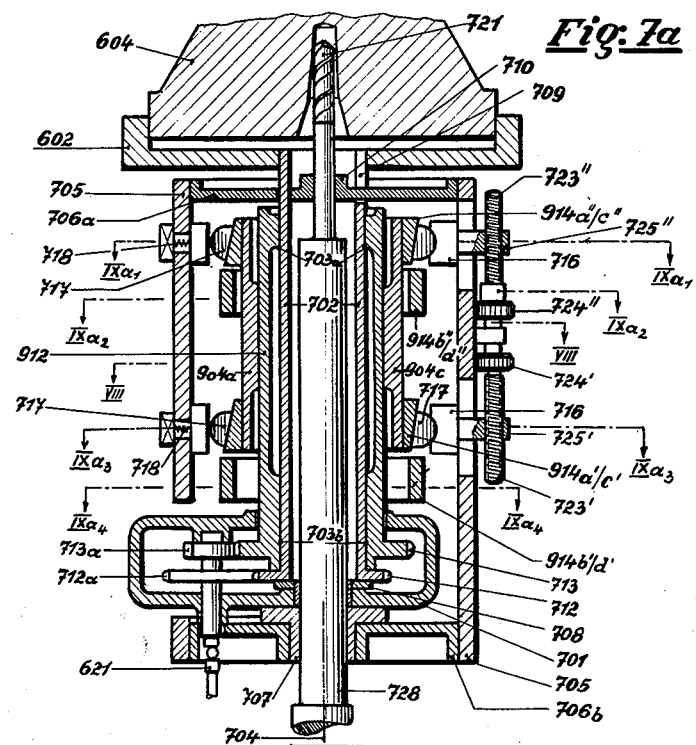

The centrifuge drum or rotor 604 is firmly clamped in the rotor holding device 602 on a vertical hollow drive shaft 702 which is placed in rotation from a motor 622 through a Cardanic shaft 621 and through a gearing 712 to 713a located in a separate housing 701 illustrated in FIG. 7a. A hollow drive shaft 702 (FIGS. 6, 7) runs in slide bearings or guides 703a and 703b formed by the displacement control spindle 912 (FIGS. 6, 7a, 8) which is adjustably held in a housing 705 by means of lunette guides.

The top of housing 705 is closed by a cover 705a which has a sleeve portion 710 for guiding the marking tool 721. The bottom of housing 705 is closed by a cover 706b which forms a guide 707 for the tool holder 728. Located on top of the guide 707 is a gear housing 701. A sealed screw nipple 708 on the bottom of housing 701 supports the hollow drive shaft 702. The displacement control spindle 912 is located upon a toothed flange 712 (FIG. 7a) of the hollow shaft 702. The housing 705 is held at its bottom by two elastic rods 804 and by two similar elastic rods 805 from above. These spring rods permit the housing, during rotation of an unbalanced workpiece 604, to perform oscillations which are translated by oscillation pick-ups (not illustrated) into electric voltages and are measured by the wattmeters 615, 616 (FIG. 6) in the conventional and above-described manner.

Mounted on the bottom of the exterior housing 606 are two lugs 630 which, as seen in FIG. 6, are located one behind the other. The lugs 630 form bearings for the pivot pin 631 of a control lever 632 for the drill 721 or any other suitable tool for producing the centering marks or other machining operation, the drill or tool being mounted on a rod 728 (FIGS. 6, 7a). The lever 632 carries a travelling nut 625 in engagement with the threaded end of the spindle 624 and operable by means of a handwheel 623. Rotation of the handwheel 623 causes the travelling nut 625 to turn the control lever 632 upwardly or downwardly about the pivot pin 631, thus displacing a fork 626 at the opposite end of the lever. The fork 626 carries a cross pin 627 mounted on the holder 628 of the lower portion 629a of a claw-type clutch. When the control lever 632 is operated by means of a handwheel 623, it shifts the clutch member 629a upwardly. Then the tool 721, vertically displaceable in the hollow spindle 702 by means of the holder rod 728, is pressed against the workpiece to be drilled. Simultaneously, the tool is arrested against rotation by the mutual engagement of the claws of the respective clutch coupling portions 629a and 629b, such rotation being otherwise possible due to entrainment of the drill by the rotating workpiece 604. When the control lever is moved in the opposite direction by operation of the handwheel 623, the tool is withdrawn from the workpiece and the lower clutch portion 629a, due to its own gravity, is disengaged from the upper clutch portion 629b and moves downward until it abuts against a stop 629.

The lower drive shaft 702 has recesses 709 at its upper end for accommodating in its interior the guiding sleeve 710 for the tool 721. Joined with the lower end of the hollow shaft 702 is a spur gear 712 which transmits driving motion to the shaft and to the workpiece from the articulated transmission shaft 621 and from a pinion 712a mounted on the latter shaft.

Figure 8:
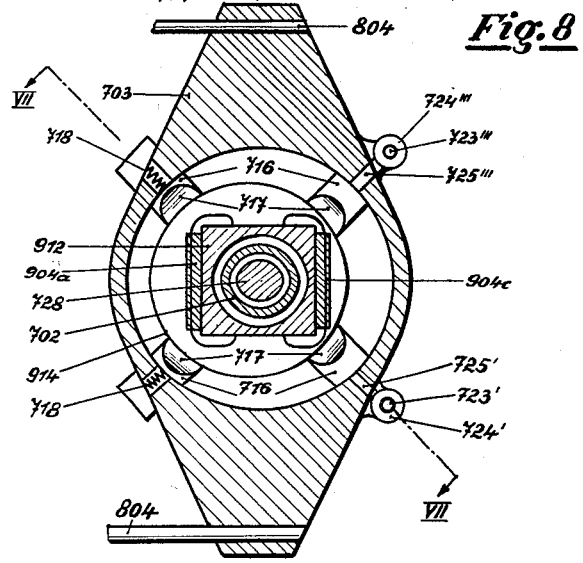

The hollow drive shaft 702 is journalled free of lost motion within the hollow displacement control spindle 912 which is provided with plane exterior sides preferably of a square cross section (FIG. 8). Mounted on the four sides of the spindle 912 are respective flat steel pieces 904a to 904d (FIGS. 7a, 8, 9 and 10) each of which has two springy ends 904a', 904a'' to 904d', 904d''. The lower end of the displacement control spindle 912 is driven by a pinion 713a (FIG. 7a) through a spur gear 713 in the same manner as the hollow drive shaft 702. However, the revolving speed of the displacement control spindle 912 is lower than, preferably only one-half as large as, the revolving speed of the hollow drive shaft 702. The entire gearing assembly is accommodated within the oil-filled and sealed housing 701.

Figure 9:
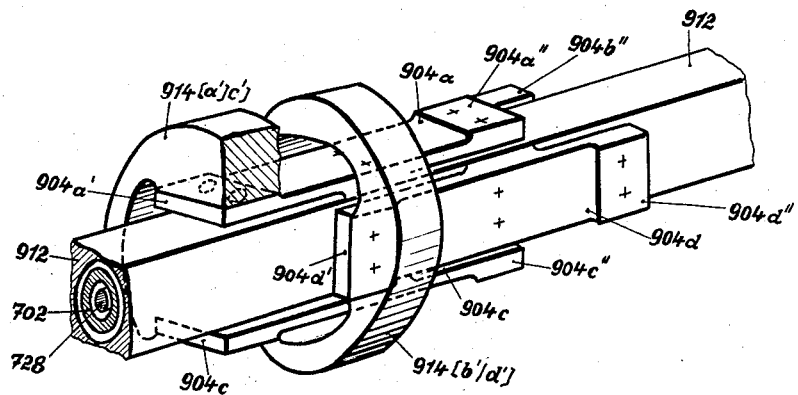
Figure 10:
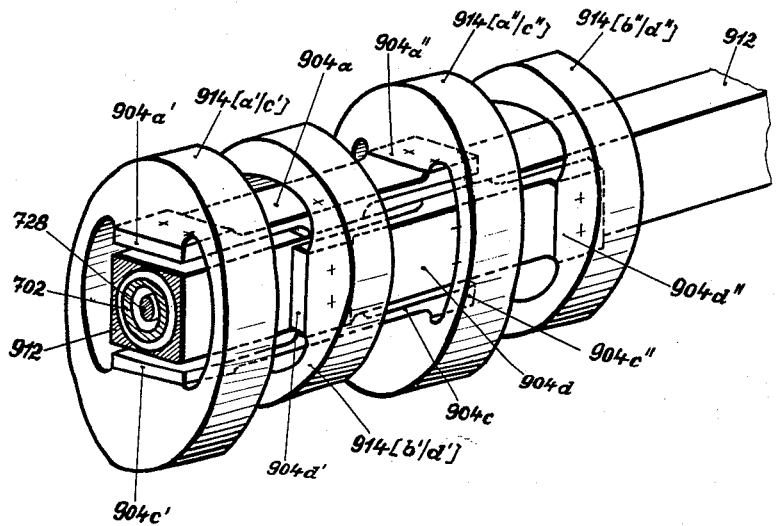

Each of the steel pieces 904a to 904d is provided on both of its elastically movable ends with fastening means for the attachment of four non-circular members 914 (FIGS. 7a, 9, 10), whose respective peripheral surfaces form the displacement faces of the device. Each two steel pieces 904a and 904c, as well as 904b and 904d, located on mutually opposite faces of the control spindle 912, carry in pairs, on each of their two elastic ends, one of these ring-shaped members. FIG. 9 shows the entire arrangement of the four elastic steel pieces, but shows only two of the displacement-face members 914(a'/c') and 914(b'/d') in relation to the square spindle 912. All four displacement faces 914(a'/c') to 914(b''/d'') are illustrated in FIG. 10. The respective displacement faces on the control spindle 912 form eccentric cams which are resiliently yielding in only one direction due to their elastic seating. In the illustrated embodiment, all four displacement faces have the same shape and they are, for example, so arranged that the first and third face on the one hand, and the second and fourth face on the other hand, have peaks in the same direction, but 90° displaced relative to the two peaks of the other pair of faces. As apparent from FIG. 8, each displacement face of the ring-shaped members 914 is carried by four lunettes 717 resting upon respective pans or similar parts 716. One-half of the number of lunettes 717 are biased against the displacing face by means of springs 718 while the other half number of lunettes are unyieldingly supported and are arranged so that they are jointly displaceable in the direction of the axis 704 in a manner similar to the displacement of the lunettes according to FIGS. 2a or 4. As a result, there are four individually adjustable systems of displacing faces which control the hollow drive shaft 702 and which permit the drive shaft to perform parallel as well as tumbling movements.

Four screw spindles, mounted on the housing 705, are provided for producing any desired displacement of the rotational axis 704 by means of the axis displacement device. Two of these screw spindles 723' and 723''' and the appertaining travelling nuts 725' and 725''' respectively are visible in FIGS. 7a and 8. The travelling nuts 725' and 725''' are connected with the holders of displaceable lunette pans 716. The screw spindles are turned with the aid of knurled handwheels 724. The displacement is effected while the workpiece is rotating. The amount of displacement is in accordance with the magnitude of the unbalance measured during the measuring run in the respective component directions. The operation and effect of the displacing means will be further described with reference to the schematic illustrations presented in FIGS. 11, 11a and 12.

According to FIGS. 11 and 12, two circular discs 1101 and 1102 of the same diameter are arranged on a revolvable square spindle 912' of square cross section. Each disc has a central driving slot 1101'' or 1102'' of rectangular shape whose length is denoted by L and whose width is denoted by B. The two discs 1101 and 1102 are axially spaced from each other a distance $a$. The discs are displaceable in lunette guides 717' in the horizontal direction $h$ and vertical direction $v$ respectively relative to a spindle 912'. The arrangement of the discs is such that their respective center points 1101' and 1102' are spaced a distance $b$ from each other on both sides respectively of the geometric axis C of spindle 912'. The respective axis 1101''' and 1102''' of the two guide slots intersect each other on the axis C at an angle $k=90°$, this being the angle between the two coordinate measuring directions. The two discs 1101 and 1102 rotate together with the spindle 912' without the possibility of mutual phase displacement. During such rotation the axis C, which also forms the locus for the intersection points of the two slot axes, travels on a circle $C_1$ of the diameter $D_1$ (equal to the spacing $b$) through the two disc center points at an angular velocity twice as large as that of the discs 1101 and 1102. That is, when the two discs have turned, for instance, an angular amount of 45°, the point C has travelled on an arc of 90°. The discs 1101 and 1102 are eccentric ring-shaped parts and have the same functions as the displacement face members 914' mounted on the spindle 912 according to FIGS. 9 and 10.

Now assume that the disc 1101, aside from its rotating movement, is also subjected to a linear displacement between its lunette guides 717' and that this displacement is in the vertical direction indicated in FIG. 12 by the double-headed arrow $v$ so that the center point 1101' of this disc will shift upwardly or downwardly. Then the center point D of the circle $C_1$ moves only half that far on the vertical diameter $D_1$ of this circle. The same applies for shifting movements of the disc 1102 in the horizontal direction indicated in FIG. 11 by a double-headed arrow $h$. Such a mechanism, as shown in principle in FIGS. 11, 11a and 12, has the disadvantage of always involving some lost motion because of the sliding guidance of the square-face spindle 912' so that some inaccuracy of the adjustments may be involved. For that reason, the function of guiding the square-face spindle 912' is preferably assigned to elastic bodies, for instance of the kind represented by the steel springs 904 according to FIGS. 9 and 10. These springs yield in only one direction, but are rigid in a direction 90° displaced relative to that of the yielding movement. In summary, the center point D of the circle $C_1$ performs movements which can be analyzed into a vertical and a horizontal component if the two discs are displaced in their respective guiding means 717' in two coordinate directions that are angularly related to each other, this angle being preferably 90°.

The shifting of the center point 1101' of disc 1101 would be accompanied by a shifting in the same direction of the rotation center point D (FIG. 11). However, if the balance-centering machine is to be equipped with a stationarily located machining tool, for instance a centering drill, then care must be taken to secure a rotation center point D which remains stationary relative to the machine housing 705. It is, therefore, necessary that when the center point 1101' moves, for instance vertically, in the upward direction, the center point 1102' must simultaneously move downwardly in the vertical direction.

The simultaneous positioning of the two discs 1101 and 1102 is schematically represented in FIG. 11a. In position 1, the two discs 1101 and 1102 lie coaxially behind each other. The corresponding slot axes 1101''' and 1102''' intersect each other on the geometric axis C of the displacement control spindle 912' in point D which is located on the stationary axis 1104 of the machining tool 1121.

In position 2, the two discs are shifted by the same amount $b/2$ upwardly and downwardly respectively. Consequently, during rotation of the spindle 912', the axis C must travel on a circle of the diameter $b$ (equal to $D_1$ in FIG. 11) about the intersection point R of the tool axis 1104 with the longitudinal slot axis 1101'''. The center point R of this circle remains at rest on the axis 1104 during the rotation, even when the two discs have rotated a further amount of 90° as illustrated in position 3. In order to make the amount of shifting movement observable, the two discs may be provided with respective zero marks at their slot axes 1101''' or 1102'''. In position 2, the zero mark of disc 1101 has shifted upwardly the amount $b/2$, whereas the zero mark of disc 1102 has travelled downwardly the same amount $b/2$. In position 3, the disc 1101 has turned 90° clockwise so that the axis 1101''' extends horizontally, the spacing $b/2$ being maintained above the point R. However, the other zero mark has reached the vertical position.

FIG. 9a represents schematically an embodiment of a displacing device operating on the principle explained above with reference to FIG. 11a, and FIG. 9b is a sectional view of an actual design of the same device. The four component mechanisms shown in FIG. 9a may be looked upon as being, in principle, cross-sectional views along the section lines $IXa_1$ to $IXa_4$ indicated in FIG. 7a, but they are so modified and combined as to represent a different overall construction capable of functioning according to FIG. 11a.

According to FIG. 9a, the four square faces of the control spindle 912 are provided with four respective steel pieces corresponding to those denoted by 904a to 904d in FIGS. 9 and 10. Mounted on the elastically yielding ends 904a' and 904a'' of the spring piece 904a, and also on the corresponding ends of the spring pieces 904b to 904d, are circular rings 913 which carry respective ball bearings 916 without lost motion. Mounted on the ball bearings are respective rings $915_1$ to $915_4$. The rings are attached by means of spring rods 917, preferably of circular cross section, to respective intermediate rings $919_1$ to $919_4$ which in turn are secured by means of similar spring rods 920 to the housing 705. The spring rods 917 serve as a linear motion guide which causes the ring center point 918 to move linearly on the axis 928 of the spindle 912 when one of the displacing devices $724'_1$ to $724'_4$ or $724''_1$ to $724''_4$ is actuated. Consequently, when for instance, the displacing mechanism $724'_1$ is being actuated, thus radially shifting the ring $915_1$, then the center point 918 can readily shift in the vertical direction against the force of the spring 918' which tends to maintain the normal position. Similarly, when actuating the displacing mechanism $724''_1$ linked with the ring $919_1$, the ring center point can move in the horizontal direction against the biasing force of the spring $918'_1$ or $918''_1$ which also tend to maintain the assembly in the normal position. For preventing the mutually opposed displacements of the ring $915_1$ to $915_4$ and $919_1$ to $919_4$ from causing the tension of the springs $918'_1$ to $918'_4$ and $918''_1$ to $918''_4$ to become excessively different from each other, the linking rods 921 or each two springs 918' or 918'' are coupled with each other in pairs by a teeter bar 922 which has a fixed pivot point 924, for instance on the housing 705. For balancing in a single reference plane, all these displacing devices can be coupled with one another, this being indicated by the dot-and-dash lines 923' and 923''. For balancing in two axially spaced reference planes, the displacement devices are coupled in pairs ($724'_{1-2}$, $724'_{3-4}$, $724''_{1-2}$, $724''_{3-4}$).

For effecting a parallel displacement of the axis of rotation 928, which corresponds to the axis D in FIG. 11, two pairs of discs are displaced simultaneously.

For effecting a tumbling movement of the axis of rotation 928 (D) when balancing in two reference planes, such as, for instance, for the workpiece 604 in FIG. 6, the two pairs of discs $915_1$, $915_2$ and $915_3$, $915_4$ are individually displaceable so that the pair of discs $915_1$ and $915_2$ forms one center point of rotation whereas the pair of discs $915_3$, $915_4$ forms an axially and radially displaced, second center point of rotation. Depending upon the magnitude of the radial spacing of these two center points of rotation, a tumbling movement of larger or smaller magnitude is imparted to the workpiece 604 as may be needed for compensating dynamic unbalance.

Figure 9B:
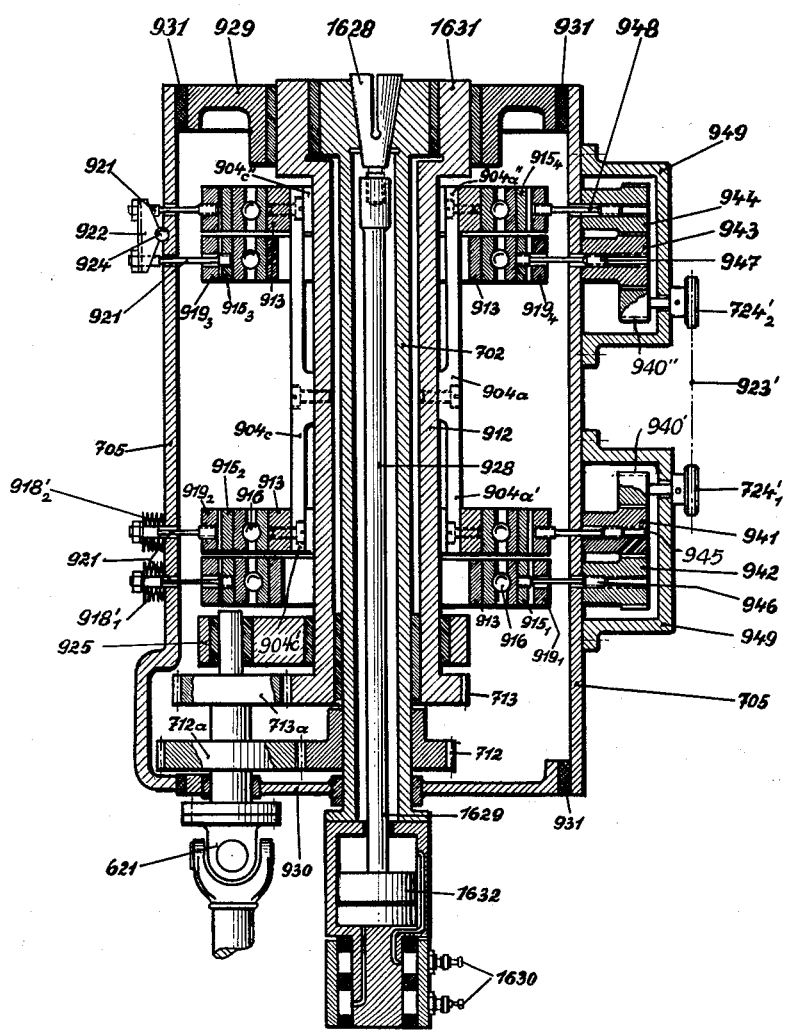

The machine design illustrated in FIG. 9b represents a longitudinal section through the axis of the hollow displacement control spindle 912 and hence is generally comparable with the illustration presented in FIG. 7a. For that reason, the parts shown in FIG. 9b and functionally similar to respective parts of FIG. 7a are denoted by the same reference characters so that it will be unnecessary to repeat the description of all individual components.

Within a housing 705, a hollow drive shaft for the rotor (not illustrated in FIG. 9b), which drive shaft corresponds to shaft 702 in FIG. 7a or shaft 401 in FIG. 4, is held in position by the rings 915 and by the springs 913, 917 (not visible in FIG. 9b) according to FIG. 9a. The displacement of the spindle position is effected by turning the manually operable knobs $724'_1$ and $724'_2$. Knob $724'_1$ carries a pinion 940' meshing with a spur gearing on a nut 941 which meshes with the spur gearing of another nut 942. Knob $724'_2$ is similarly cooperative with two nuts 943 and 944. When the respective knobs are being actuated, each pair of nuts effects a parallel displacement of the spindle as follows: the nuts 941 to 944 are in threaded engagement with respective screw bolts 945 to 948 each having, for instance, a right-hand thread. Each of the four pairs of rings 913, 915 and the respective intermediate ball bearings 916 forms a unit which is firmly connected with the respective bolts 945 to 948. Consequently, when either one of the control knobs is being turned, the two units of rings controlled by that knob move in mutually opposed directions. That is, when the one unit is moved toward the left in the plane of illustration, then the other unit is constrained to move toward the right. The displacing mechanism is protected by a cover 949 of the housing 705. Instead of a manual actuation, all control knobs may be actuated simultaneously and automatically, this possibility being schematically indicated by a dot-and-dash line 923'.

The two lower units of rings are kept in the normal position by springs $918'_1$ or $918'_2$ which are tensioned between respective rods 921 and the outer wall of housing 705. As an alternative, the upper two units of rings in FIG. 9b are shown equipped with the teeter-bar coupling 922 as schematically illustrated in FIG. 9a and described above.

As in the embodiments according to FIGS. 6 and 7a, the spindles 702 and 912 are driven from a motor (not illustrated in FIG. 9b) through an articulated coupling 621 and through respective spur-gear transmissions 712a, 712 and 713a, 713, so that the spindle 702 runs at twice the revolving speed of the spindle 912 to effect the above-described movement of the center point D explained with reference to FIG. 11a.

The transmission shaft of the spur gears 712a and 713a is journalled in a bearing sleeve 925. To permit eccentric movement of the two spindles 702 and 912 relative to the machine housing 705, sufficient space for such movement is provided between the spindle bearings 929 and 930 on the one hand, and the housing 705 on the other hand. This clearance space is sealed against ingress of dirt into the housing, for instance by means of rubber gaskets 931.

The operation of the machine according to FIGS. 6 to 10 is as follows:

After the workpiece 604 is inserted and firmly clamped in the rotor-holding device or chuck 602, the switch 609 is actuated and the drive motor 622 is energized. Motor 622 now rotates the holder and workpiece at the normal operating speed of the balancing operation through the articulated shaft 621 and the transmission gears 712a and 712. The displacement control spindle 912 is simultaneously driven to run at one-half of the operating speed so that the displacement-face bodies 914 mounted on the leaf springs 904 are also in rotation at the latter speed. When the rotating workpiece 604 is unbalanced, it causes the housing 705 mounted on the springs 804, to oscillate. The machine, like the machine described above with reference to FIGS. 1a to FIG. 5a, is equipped with one or more pendulums (507, 509 in FIG. 5a) or with an electric compensating circuit to provide a counter E.M.F. (according to FIGS. 5b and 5c) in order to prevent the mass forces resulting from the excentrically rotating parts of the rotor receiving device from affecting the indication in the wattmeters 615, 616. Consequently, the pointer deflections which appear in the wattmeters during the rotation of the workpiece are indicative only of any discrepancy between the gravity center of the rotor and the center of rotation in the particular reference plane.

The measuring of the unbalance is effected for the two reference planes $E_1$ and $E_2$ (FIG. 6) relative to two component measuring directions in each plane. This measuring operation is carried out with the aid of the above-mentioned electric analyzing network. Assume that the switch 640 is first placed in the position $e_1$ which relates to the upper reference plane $E_1$. With this setting, the remote control switches 618 and 620 which are used as centrally located adjusting means instead of the handwheels 724″, 724‴, can be actuated simultaneously until both wattmeters indicate zero. Thereafter the switch 640 is placed toward the right into the position $e_2$ which relates to the lower reference plane $E_2$. Thereafter the wattmeter deflections now observed are again zeroed by means of the knobs 119 and 117. Now, the hollow spindle 912 revolves in such a position of its axis of revolution that this axis is coincident with the inertia axis of the workpiece. Thereafter the switch 610 is actuated with the effect of setting the drive motor to the lower machining speed. Then the handwheel 623 is turned. It places the claw-type clutch 629a, 629b in operation and thereafter shoves the drill 721 (FIG. 7a) into the workpiece. When the required drilling depth is attained, a limit contact (not illustrated) or the like control means disconnects the machine from the power supply and the balance-centering operation is terminated so that the workpiece can be removed from the machine. The entire operation can also be carried out automatically in accordance with the circuit diagram of FIGS. 13 to 15 described below.

The fulcrum point of a tumbling movement of the centrifuge drum 604 or similar workpiece is preferably placed into one of the two reference planes $E_1$ or $E_2$ so that the unbalance moment can be compensated in the other reference plane. The modification shown in FIG. 7b is an example of a device that permits such a positioning of the fulcrum point.

Accordingy to FIG. 7b, the lunette paths of the displacing device for the rotation axes of a rotor receiving device otherwise designed and operative as described in the foregoing, are displaceable to respectively different extents and impose upon the rotation axis a corresponding displacement. The magnitude of the displacement depends upon the spacing between the center lines 717aa and 717bb of the respective lunette guides 717a and 717b from the particular reference plane $E_1$ or $E_2$ under observation at a time. The displacement is effected by means of screw spindles 731, 733, and 738 which cooperate with the respective lunette sliders 734 and 735 as well as with an auxiliary slider 739. The knurled handwheel 724′ can be shifted toward the left on the spindle 731, for instance when the device is to be set with reference to the plane $E_1$. Handwheel 724′ is prevented by a key 732 from revolving relative to the spindle 731. When the handwheel is shifted toward the left, it becomes coupled with the spindle 733 in the position illustrated in FIG. 7b. When now the handwheel 724′ is turned, the sliders 734 and 735 are shifted on the slideway 703′ by means of the screw threads 731a and 733a respectively, the direction of shifting motion being dependent upon the direction of rotation imparted to the handwheel 724′. The pitch of the screw threads at 731a and 733a and hence the respective amounts of displacement imparted to the respective lunette guides, have a ratio equal to the ratio of the respective spacing between the center line 717aa and 717bb from the reference plane $E_1$.

For adapting the device to unbalance analysis in the other reference plane $E_2$, the handwheel 724′ is shifted toward the right and becomes coupled with a spur gear 736 which meshes with a spur gear 737 on the screw spindle 738 for the auxiliary slider 739. When the handwheel 724′ is being turned, the adjusting operation remains as described in the foregoing because the handwheel 724′ remains connected with the screw spindle 731 and the auxiliary slider 739 is now connected with the slider 735 through the screw spindle 733 which can slide back and forth upon the spindle 731. Also in this case, the amount of displacement of the sliders and of the lunettes is equal to the ratio of the different pitch of the screw threads. This ratio corresponds to the respective distances of the center lines 717aa and 717bb from the reference plane $E_2$, provided, and as shown, the transmision ratio in the gearing 736, 737 is 1:1.

The adjusting means 118 to 120, or 618 to 620 and 623, may be of the mechanical or electrical type. When providing electrical control means, the machine can readily be operated for fully automatic performance, preferably in conjunction with a watt-metric relay. An embodiment of such an automatic control system is illustrated by the circuit diagram and its components shown in FIGS. 13 to 15.

FIG. 13 relates to a modified unbalance measuring and indicating machine and also shows those components of a balance-centering machine according to the invention that control the automatic operation. In contrast to the embodiment according to FIG. 1b, the one shown in FIG. 13 is provided with only one phase transmitter 311a. For this reason, a four-position switch 162a, conventional for such purposes, is provided. This switch connects the wattmeter 115a selectively with the four measuring components for the unbalance analysis. The oscillation pick-up devices of the system are denoted by 102 and 103′, and the electric analyzing network by 153. Each of the movable contacts of the four-position switch 162a cooperates with four bank contacts that are connected with the electric network and with the phase transmitter. These four bank contacts correspond to the four measuring components left-vertical, right-vertical, left-horizontal and right-horizontal. The four-position switch 162a is coupled with a switch 162b for the selection of the control motors 117′ to 120′. The motor selector switch 162b has each of its two movable contacts cooperating with a bank of four contacts that are connected with the respective four control motors. These four motors correspond, for instance, to the central adjusting knobs 117 to 120 in FIG. 1a. The combined four-position and motor-selector switch 162a, 162b is actuated by means of a relay whose coil is illustrated in FIG. 13 at 161a.

The field coils 115′ of the wattmeter 115a receive current from the phase transmitter 311a depending upon the selected position of the movable contacts in the four-position switch. The moving coil 115″ of the wattmeter is supplied with voltage from the oscillation pick-ups through the electric analyzing network 153. The pointer of the wattmeter comprises a soft spring 166 or the like (FIG. 14) which carries, preferably near its end, a contact piece 166a and a magnet armature 166b. The pointer 166 with contact 166a forms part of an electric circuit.

Located beneath the pointer are three contact pieces 167a, 167b and 167c (FIGS. 14, 15). The contacts 167a and 167c serve for operating the control motors 117' to 120', whereas the contact 167b serves for disconnecting these motors. The pointer 166 is attracted by an electromagnet 165 when the excitation circuit of this magnet is energized through an interrupter switch 164 under control by a cam 163 which rotates in synchronism with the workpiece and is mounted, for instance, on the shaft of the phase transmitter 311a.

During the unbalance measuring run of the machine, the wattmeter pointer 166 moves in either the positive or negative direction measured from its zero position which is preferably located in the center of the indicating scale. Adjustable deflection limiting stops 166c (FIG. 15) may be provided. Each time the synchronously rotating cam 163 closes the contact 164 and thus excites the magnet 165, this magnet attracts the armature 166b of the pointer 166. As a result, the end contact 166a of the pointer touches one of the respective stationary contact pieces 167a, 167b or 167c. Assume, for instance, that the contact piece 167c is temporarily engaged in this manner. This supplies voltage to the coil 168 in the circuit of the motor selector switch 162b. Coil 168 has the effect of connecting the current supply line to the circuit of the selected motor 119', which circuit was previously prepared by the positioning of the four-position switch 162a and by the corresponding positioning of the motor selector switch 162b. The line connection thus established causes the motor 119' to run in a given direction. The motor displaces the displacement control spindle of the machine until the wattmeter pointer has returned to zero. In this moment, the magnet 165 is again excited, and the pointer contact 166a engages the zero contact 167b. This has the result that the relay 170 is excited and opens the relay contact 171. The circuits of relay coils 168 and 169 are interrupted and the corresponding relays drop off, so that the previously running control motor is stopped.

In the illustrated embodiment, the relay 170 has another relay contact 172 connected in the energizing circuit of the relay 161a which controls the operation of the four-position switch 162a. Consequently, when the relay 170 is energized in the above-described manner, the contact 172 in relay 170 is temporarily closed and applies a voltage pulse to the control relay 161a for the four-position switch, thus switching the four-position switch and the motor selector switch 162b for the next following switching position. In this new position, the next following unbalance measuring operation and selection of a control motor will take place in a manner analogous to the operation described in the foregoing, until all four components of unbalance are measured and the wattmeter indications are successively zeroed by the resulting displacement of the rotation axis with the aid of the control motors and the resulting adjustment of the axis displacing device. Thereafter the switches 162a and 162b again reach the starting position. However, as will be understood from the foregoing, the particular sequence of the measuring and displacing operation required for obtaining accurate coincidence between inertia axis and axis of rotation of the workpiece, is inessential to the invention.

As a matter of fact, such an automatic system may be equipped with four wattmeters, one for response to each of the four respective unbalance components. In that case, the four-position switch 162a is eliminated, and all four control motors 117' to 120' can operate simultaneously to effect the desired axial displacement.

While in the foregoing reference is made to the dynamic balance centering of a workpiece during continuous rotation of that workpiece, the method and apparatus according to the invention are also applicable for a static analyzing method for locating the rotation axis about which an oscillation-free run is secured. To this end, the workpiece is mounted in a machine according to the invention, and the axis of rotation of the workpiece holding means is displaced by the above-described means according to the invention until the workpiece will remain at rest, without pendulous movements, in any position that may be applied to the workpiece while journalled in its bearings.

The balance-centering machine illustrated in FIGS. 16a and 16b, whose workpiece holding device is separately shown on a larger scale in FIG. 16c, is designed as follows:

Mounted on the machine base 16.01 are the balance-centering machine portion 16.00a and the machine tool portion 16.00b. The machine portion 16.00a comprises a hollow spindle 16.401 (similar to item 401 in FIG. 4) which is adjustable in accordance with the invention and which carries on its right-hand end a rotor or workpiece, for instance a blower rotor 16.404. The spindle 16.401 is driven from motor 16.622 through an endless V-belt 16.25, an articulated shaft 16.621 and a gear transmission 16.92. The articulated shaft 16.621 simultaneously drives the phase transmitter 16.03. The displacement of the hollow spindle 16.401 is effected by means of four displacement devices acting in the one component measuring direction (for instance vertical) and by four displacement devices acting in the other component measuring direction (for instance horizontal). These displacing devices are similar to those denoted by 724' or 724" in FIG. 9a, but they are not visible in the illustration of FIG. 16a and FIG. 16b, where they are located in pairs within protective housings 16.724a and 16.724b. For static balancing, all displacing mechanisms are coupled with one another. For dynamic balancing, however, each pair of a vertical and a horizontal displacing mechanism is driven individually. In the machine according to FIG. 16a, the displacing mechanisms (724' and 724") of the four rings 915 can be adjusted individually by hand or, if they are coupled with one another, they can be adjusted by means of the rotatable knobs 16.11 and 16.12 or with the aid of two electric motors 16.05a and 16.05b (located one behind the other) which operate through the shaft 16.723. The motor-driven displacing operation is controlled by means of manually operated switches, or is carried out automatically, for instance in accordance with the circuit diagram explained above with reference to FIGS. 13 to 15. A fully automatic operation of the machine is preferable.

The two instruments or wattmeters used for measuring the unbalance are denoted in FIGS. 16a and 16b by 16.15 and 16.16. These instruments correspond to those denoted by 115 and 116 respectively in FIG. 1. The reference-plane selector switch 16.40 is identical with the one denoted by 140 in FIG. 1. The main switches 16.51 correspond to those denoted by 151 in FIG. 1.

The machining portion 16.00b can readily be adapted to any particular requirements. The illustration shows a machine tool with a revolvable unit or turret equipped with drills, reamers and finishing tools. A workpiece can thus be provided on one and the same machine with an accurately located center bore which determines the rotation axis of the rotor and, when the operation is completed, is of the desired finish and the final tolerance.

For securing the housing 16.705 (FIG. 16b) rigidly and immovably in position while the workpiece is being clamped into the workpiece holder or is being removed therefrom, and also while the workpiece 16.04 is being machined by the tools, an arresting device is provided which in the illustrated example is controlled electromagnetically. This arresting device comprises a spring arresting rod 16.17 which has one of its ends firmly clamped to the machine housing at 16.18. The housing 16.705 of the displacing device carries a lug 16.19 with an approximately prismatic recess engageable by a pin 16.20 mounted on the rod 16.17. The electromagnet 16.21 is actuated under control by the attendant or automatically. When the electromagnet attracts the end of the rod 16.17, it releases the housing 16.705 so that it can freely oscillate on the supporting leaf springs 16.503 during the balancing operation. The machine is equipped with oscillation pick-ups 16.518 similar to those shown in FIG. 5. The feeler or sensing element 16.518' of the pick-up 16.518 shown in FIG. 16b is connected to wing 16.705a of the housing 16.705. Denoted by 718' in FIG. 16b are the pressure springs for the lunette guide which correspond to those shown in FIG. 9a or FIG. 7a.

As shown in FIG. 16c, the rotor-holding means of the machine is equipped with a clamping chuck 16.28. The rotor, here consisting of the fan wheel of a blower, is equipped with a solid hub portion 16.27 which is riveted to the body of the fan wheel. This hub portion is clamped from the outside by the chuck claws and is thus rigidly kept in position for a stiff torque transmission during the entire machine operation including the balancing run as well as the subsequent machining run. The centered machining by the tools of the machining portion 16.00b of the machine is effected in the originally solid hub portions 16.27. The chuck claw 16.28 is firmly mounted on a tensioning rod 16.29 which is moved, for instance, by means of a compressed-air device which is connected by means of supply nipples 16.30 (FIG. 16a). The rod 16.29 either pulls the claw 16.28 into the collar 16.31 or pushes it out of that collar.

It will be understood that the invention is not limited to the particular embodiments illustrated and described in this specification, but permits of various other embodiments and modifications, particularly with respect to the individual components of the machinery and instrumentalities to be applied for performing the novel method, without departing from the essence of the invention and within the scope of the claims annexed hereto.

I claim:

1. The method of balance-centering a rotor, wherein a journal is provided for rotation of the rotor to be balanced, which comprises rigidly mounting the rotor on holding means in a fixed position relative thereto, rotating the rotor and holding means as a rigid unit in said journal, continuously rotating and radially displacing during such continuous rotation the holding means and rotor as a unit relative to said journal to shift the axis of rotation of said unit into coincidence with the inertia axis of the unit, and during such continuous rotation compensating the unbalance forces created by the radial displacement of said unit to establish a given balance condition about the displaced axis of rotation, and machining the rotor about the displaced axis of rotation said displacement of axis of rotation of said unit being independent of the axis of the tool performing said machining.

2. The method of balance-centering a rotor, wherein a journal is supported on a base for oscillatory motion relative thereto and a rotor to be balanced is mounted in holding means rotatable in said journal, which comprises the steps of continuously rotating the holding means to produce journal oscillations due to unbalance of the rotor, radially displacing the axis of rotation of the holding means and rotor as a unit relative to the journal into a predetermined position relative to the inertia axis of the rotor, and compensating the unbalance forces then caused by the holding means due to such displacement, whereby a given balance condition of the rotor about the displaced axis of rotation is established, and machining the rotor about the displaced axis of rotation during such continuous rotation, said displacement of axis of rotation of said unit being independent of the axis of the tool performing said machining.

3. In a machine for the balancing of rotors wherein tool means are provided for machining the rotor after balancing, a fixed base, a bearing support resiliently mounted relative to said base, rotatable holding means for receiving the rotor in non-rotatable relation thereto, a journal structure of variable eccentricity relative to said holding means for supporting said holding means and mounted for rotation within said bearing support, said journal structure comprising a control spindle having a plurality of eccentric displacement faces on its periphery, a drive shaft connected to said holding means and journalled within said control spindle, a motor connected to said drive shaft for driving said rotor and holding means as a unit, bearing means mounted on said bearing support and in journalling engagement with said journal structure, said bearing means comprising a plurality of guiding elements in contact with and displaceable along respective ones of said displacement faces for varying the position of said control spindle relative to said holding means, unbalance measuring means responsive to oscillations of said support due to unbalance of the rotor, control means including a control shaft in operative connection with said guiding elements to displace the latter along said journal structure for varying said eccentricity in accordance with unbalance measured by said measuring means to thereby adjust the eccentricity of rotation of said journal structure and of said holding means relative to said bearing support and thus to adjust the axis of rotation of said holding means and rotor as a unit into a predetermined relation with respect to the inertia axis of the rotor, and differential transmission means connected between said holding means and said journal structure and having a control member for adjusting the angular position of said holding means with respect to said journal structure as said journal structure and said holding means are being driven from said motor.

4. A machine for balancing rotors, comprising a fixed base, a bearing support resiliently mounted for oscillation relative to said base, rotatable holding means for receiving the rotor in non-rotatable relation thereto, a journal structure of variable eccentricity relative to said holding means for supporting said holding means and mounted for rotation within said bearing support, said journal structure comprising a control spindle having a plurality of eccentric displacement faces on its periphery, a drive shaft connected to said holding means and journalled within said control spindle, a motor connected to said drive shaft for driving said rotor and holding means as a unit, bearing means mounted on said bearing support and in journalling engagement with said journal structure for supporting said control spindle, said bearing means being displaceable relative to said journal structure for varying said eccentricity, unbalance measuring means responsive to oscillations of said support due to unbalance of the rotor displacement, control means including a control shaft connected with said bearing means for displacing said bearing means in accordance with unbalance measured by said measuring means to thereby adjust the eccentricity of rotation of said journal structure and of said holding means relative to said bearing support and thus to adjust the axis of rotation of said holding means and rotor as a unit into a predetermined relation with respect to the inertia axis of the rotor, differential gearing means operably connected between said holding means and said journal structure for coordinating relative movement therebetween to provide continuous rotation of said holding means and rotor during rotation of said control shaft while the latter is displacing said bearing means, means to adjust the relative angular position of said control spindle with respect to the holding means, and tool means located so as to machine the rotor about the said adjusted axis of rotation of said holding means during the continuous rotation of said rotor.

5. A machine for balancing rotors, comprising a fixed base, a bearing support resiliently mounted for oscillation relative to said base, rotatable holding means for receiving the rotor in non-rotatable relation thereto, a journal structure for supporting said holding means and mounted for rotation within said bearing support, said journal structure having a plurality of journal diameters of respectively different eccentricity, a motor connectable for driving said rotor and holding means as a unit, an axis displacing device having bearing means mounted on said support and selectively engageable with different ones of said respective journal diameters whereby the axis of rotation of said journal structure is displaced relative to said holding means into a desired position relative to the rotor held by said holding means, unbalance measuring means responsive to oscillations of said support due to unbalance of the rotor, control means including a control shaft connected with said axis-displaicng device for displacing said bearing means and thus said axis of rotation of said journal structure in accordance with unbalance measured by said measuring means to thereby adjust the eccentricity of rotation of said journal structure and of said holding means relative to said bearing support and thus to adjust said holding means and rotor as a unit into a predetermined relation to the inertia axis of the rotor, differential transmission means connected between said holding means and said journal structure and having a control member for adjusting the angular position of said holding means with respect to said journal structure as said journal structure and said holding means are being driven from said motor, and tool means mounted in said journal structure so as to machine the rotor about said adjusted axis of rotation of said holding means during the continued rotation of said rotor.

6. A machine for balancing rotors, comprising a fixed base, a bearing support resiliently mounted for oscillation relative to said base, rotatable holding means for receiving the rotor in non-rotatable relation thereto, a journal structure having diaimeters of variable eccentricity relative to said holding means for supporting said holding means and mounted for rotation within said bearing support and for angular rotational adjustment relative to said holding means, bearing means mounted on said bearing support and in journalling engagement with said journal structure, said bearing means being linearly and continuously displaceable axially of said journal structure for varying said eccentricity, unbalance measuring means responsive to oscillations of said support due to unbalance of the rotor, displacement control means including a control shaft connected with said bearing means for displacing said bearing means in accordance with unbalance measured by said measuring means to thereby adjust the eccentricity of rotation of said journal structure and of said holding means relative to said bearing support and thus to adjust the axis of rotation of said holding means and rotor as a unit into a predetermined relation with respect to the inertia axis of the rotor, adjusting mean operatively connected between said unit and said journal structure for adjusting their angular position relative to each each other during operation of the machine, and differential transmission means operably connected between said motor and said journal structure so as to provide continuous rotation of said rotor and holding means unit as well as of said journal structure during said angular relative adjustment of said journal structure relative to said holding means, and tool means mounted in said journal structure so as to machine the rotor about said adjusted axis of rotation of said holding means during the continued rotation of said rotor.

7. A machine for balancing a rotor, comprising a fixed base, a bearing support resiliently mounted with respect to said base, rotatable holding means for receiving the rotor in non-rotatable relation thereto, an eccentric journal structure rotatably disposed within said bearing support, said journal structure comprising a control spindle having a plurality of eccentric displacement faces on its periphery, a drive shaft connected to said holding means and journalled within said control spindle, a motor connected to said drive shaft for driving said rotor and holding means as a unit, bearing means mounted on said bearing support for supporting said control spindle, said bearing means comprising a plurality of guiding elements in contact with and displaceable along respective ones of said displacement faces for varying the position of said control spindle relative to said bearing support, unbalance measuring means responsive to oscillations of said support due to unbalance of the rotor, displacement control means including a control shaft connected with said bearing means for displacing said guiding elements in accordance with unbalance measured by said measuring means to thereby adjust the eccentricity of rotation of said journal structure and of said holding means relative to said bearing support and thus to adjust the axis of rotation of said holding means and rotor as a unit into a predetermined relation with respect to the inertia axis of the rotor, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

8. A machine for balancing rotors, comprising a fixed base, a bearing support resiliently mounted for oscillation relative to said base, rotatable holding means for receiving the rotor in non-rotatable relation thereto, a journal structure having a cylindrical bearing surface inclined with respect to the axis of rotation of said rotatable holding means for supporting said holding means and mounted for rotation within said bearing support, a pair of diametrically opposed lunette guide structures on said bearing support and bearing against said cylindrical bearing surfaces of said journal structure at diametrically opposed surface positions thereof, one of said guide structures being slidingly engaged with respect to said cylindrical bearing surface for displacing said holding means transversely relative to said bearing support, a motor for driving said rotor and holding means as a unit and for driving said journal structure, transmission means connected between said holding means and said motor and including a drive shaft journalled within said journal structure for driving said rotor and holding means, displacement control means for axially displacing said guide structures along said cylindrical bearing surfaces of said journal structure, unbalance measuring means responsive to oscillations of said support due to unbalance of the rotor, said displacement control means including a control shaft connected with said one lunette guide structure for slidingly positioning said guide structure along said inclined surface to displace said journal structure in accordance with unbalance measured by said measuring means to adjust the eccentricity of rotation of said journal structure and of said holding means relative to said bearing support and thus to adjust the rotational axis of said holding means and rotor as a unit into a predetermined relation with respect to the inertia axis of the rotor, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

9. A machine for balancing rotors, comprising a fixed base, a bearing support resiliently mounted for oscillation relative to said base, rotatable holding means for receiving the rotor in non-rotatable relation thereto, a journal structure having a cylindrical bearing surface inclined with respect to the axis of rotation of said rotatable holding means for supporting said holdings means and mounted for rotation within said bearing support, a pair of diametrically opposed lunette guide structures on said bearing support and bearing against said cylindrical bearing surface of said journal structure at diametrically opposed surface positions thereof, one of said guide structures being slidingly engaged with respect to said cylindrical bearing surface for displacing said holding means transversely relative to said bearing support, each of said lunette guide structures comprising a lunette member having a concave surface portion engaged with one each of said opposed surface portions of said cylindrical bearing surface, a motor for driving said rotor and holding means as a unit and for driving said journal structure, transmission means connected between said holding means and said motor and including a drive shaft journalled within said journal structure for driving said rotor and holding means, displacement control means for axially displacing said guide structures along said cylindrical bearing surfaces of said journal structure, unbalance measuring means responsive to oscillations of said support due to unbalance of the rotor, said displacement control means including a control shaft connected with said one lunette guide structure for slidingly positioning said one guide structure along said inclined surface to displace said journal structure in accordance with unbalance measured by said measuring means to adjust the eccentricity of rotation of said journal structure and of said holding means relative to said bearing support and thus to adjust the rotational axis of said holding means and rotor as a unit into a predetermined relation with respect to the inertia axis of the rotor, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

10. A machine for balancing rotors comprising a fixed base, a bearing support resiliently mounted for oscillation relative to said base, rotatable holding means for receiving the rotor in non-rotatable relation thereto, a journal structure comprising a control spindle having peripheral surfaces of variable eccentricity relative to said holding means for supporting said holding means and mounted for rotation within said bearing support, a drive shaft connected to said holding means and journalled within said control spindle, a motor connected to said drive shaft for driving said rotor and holding means as a unit, bearing means mounted on said resilient support and in journalling engagement with said journal structure, said bearing means being linearly and continuously displaceable relative to said surfaces of said journal structure for varying the amount of and position of said eccentricity, unbalance measuring means responsive to oscillations of said support due to unbalance of the rotor, displacement control means including a control shaft connected with said bearing means for displacing said bearing means in accordance with unbalance measured by said measuring means to thereby adjust the eccentricity of rotation of said journal structure and of said holding means relative to said bearing support and thus to adjust the axis of rotation of said holding means and rotor as a unit into a predetermined relation with respect to the inertia axis of the rotor, differential transmission means connected between said holding means and said journal structure and having a control member for adjusting the angular position of said holding means with respect to said journal structure as said journal structure and said holding means are being driven from said motor, and axially displaceable tool means coaxial with said bearing support for machining the rotor about said adjusted axis of rotation of said holding means.

11. A machine for balancing rotors, comprising a fixed base, a bearing support member resiliently mounted for oscillation with respect to said base, rotor-holding means, a motor and drive means connectable with said holding means for rotating a rotor held therein, a journal structure of variable eccentricity relative to said holding means for supporting said holding means and mounted for rotation within said bearing support, said journal structure being provided with rotatable control spindle means, said spindle means having a cam surface, means for sensing and indicating the unbalance in said rotor, displacement control means cooperative with said cam surface for displacing the rotative axis of said drive means in accordance with said unbalance, a mechanism for journalling said spindle means on said drive means, universal-joint interconnecting means between said journalling mechanism and said bearing support member to allow displacement of the rotative axis of said drive means relative to said bearing support member upon actuation of said displacement control means, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

12. A machine for balancing rotors, comprising a fixed base, a bearing support member resiliently mounted for oscillation with respect to said base, rotor-holding means, a motor and drive means connectable with said holding means for rotating a rotor held therein, a journal structure of variable eccentricity relative to said holding means for supporting said holding means and mounted for rotation within said bearing support, said journal structure being provided with rotatable control spindle means, said spindle means comprising a pair of axially spaced cam surfaces, said cam surfaces being of mutually different angular disposition relative to the axis of rotation of said drive means, means for sensing and indicating the unbalance in said rotor, displacement control means cooperative with said cam surfaces for displacing the rotative axis of said drive means in accordance with said unbalance, mechanism for journalling said spindle means on said drive means, universal-joint interconnecting means between said journalling mechanism and said bearing support member to allow displacement of the rotative axis of said drive means relative to said bearing support member upon actuation of said displacement control means, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

13. A machine for balancing rotors, comprising a fixed base, a bearing support member resiliently mounted for oscillation with respect to said base, rotor-holding means, a motor and drive means connectable with said holding means for rotating a rotor held therein, a journal structure of variable eccentricity relative to said holding means for supporting said holding means and mounted for rotation within said bearing support, said journal structure being provided with rotatable control spindle means, said spindle means comprising a pair of axially spaced cam surfaces, said cam surfaces being of mutually different angular disposition relative to the axis of rotation of said drive means, means for sensing and indicating the unbalance in said rotor, displacement control means cooperative with said cam surfaces for displacing the rotative axis of said drive means, mechanism for journalling said spindle means on said drive means, universal-joint interconnecting means between the axial ends of said journalling mechanism and opposite end portions, respectively, of said bearing support member to allow displacement of the rotation axis of said drive means relative to said bearing support member upon actuation of said displacement control means, compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

14. A machine for balancing rotors, comprising a fixed base, a bearing support member resiliently mounted for oscillation with respect to said base, rotor-holding means, a motor and drive means connectable with said holding means for rotating a rotor held therein, a journal structure of variable eccentricity relative to said holding means for supporting said holding means and mounted for rotation within said bearing support, said journal structure being provided with rotatable control spindle means, said spindle means comprising a pair of axially spaced cam surfaces, said cam surfaces being of mutually different angular disposition relative the axis of rotation of said drive means, means for sensing and indicating the unbalance in said rotor, displacement control means cooperative with said cam surfaces for displacing the rotative axis of said drive means in accordance with said unbalance, mechanism for journalling said spindle means on said drive means, universal-joint interconnecting means between the axial ends of said journalling mechanism and opposite end portions, respectively, of said bearing support member to allow displacement of the rotation axis of said drive means relative to said bearing support member upon actuation of said displacement control means, said bearing support member comprising an oil-filled housing surrounding said spindle means, said displacement control means, said journalling mechanism and said interconnecting means; compensating means for compensating the eccentric mass of said journal structure, and differential transmission means connected between said holding means and said journal structure and having a control member for adjusting the angular position of said holding means with respect to said journal structure as said journal structure and said holding means are being driven from said motor.

15. A machine for balancing rotors, comprising a fixed base, a bearing support member resiliently mounted for oscillation with respect to said base, rotor-holding means, a motor and drive means connectable with said holding means for rotating a rotor held therein, a journal structure of variable eccentricity relative to said holding means for supporting said holding means and mounted for rotation within said bearing support, said journal structure being provided with rotatable control spindle means comprising a pair of axially spaced cam surfaces, said cam surfaces being of mutually different angular disposition relative the axis of rotation of drive means, means for sensing and indicating the unbalance in said rotor, displacement control means cooperative with said cam surfaces for displacing the rotative axis of said drive means, mechanism for journalling said spindle means on said drive means, universal-joint interconnecting means between the axial ends of said journalling mechanism and opposite end portions, respectively, of said bearing support member to allow displacement of the rotation axis of said drive means relative to said bearing support member upon actuation of said displacement control means, a counter-mass mechanism linked to said spindle means and cooperatively connected with said bearing means to counteract oscillatory movement of said bearing support member due to the eccentricity of said control spindle, and differential transmission means connected between said holding means and said journal structure and having a control member for adjusting the angular position of said holding means with respect to said journal structure as said journal structure and said holding means are being driven from said motor.

16. A machine for balancing rotors, comprising a fixed base, a bearing support member resiliently mounted for oscillation with respect to said base, rotor-holding means, a motor and drive means connectable with said holding means for rotating a rotor held therein, rotatable control spindle means, said spindle means comprising a pair of axially spaced cam surfaces, said cam surfaces being of mutually different angular disposition relative to the axis of rotation of drive means, means for sensing and indicating the unbalance in said rotor, displacement control means cooperative with said cam surfaces for displacing the rotative axis of said drive means, mechanism for journalling said spindle means on said drive means, universal-joint interconnecting means between the axial ends of said journalling mechanism and opposite end portions, respectively, of said bearing support member to allow displacement of the rotation axis of said drive means relative to said bearing support member upon actuation of said displacement control means, a counter-mass lever flexibly pivoted to said bearing support member and having one end constrained in bearing engagement against one of said cam surfaces, and differential transmission means connected between said holding means and said journal structure and having a control member for adjusting the angular position of said holding means with respect to said journal structure as said journal structure and said holding means are being driven from said motor.

17. A machine for balancing rotors, comprising a fixed base, a bearing support resiliently mounted for oscillation relative to said base, rotatable holding means for receiving the rotor in non-rotatable relation thereto, a motor for driving said holding means and rotor as a unit, a journal structure for supporting said holding means and mounted for rotation within said bearing support, said journal structure having a cylindrical bearing surface inclined with respect to the axis of rotation of said rotatable holding means, a pair of diametrically opposed lunette guide structures bearing against said cylindrical bearing surface at diametrically opposed surface positions thereof, one of said guide structures being slidingly engaged with respect to said cylindrical bearing surface for displacing said holding means transversely relative to said bearing support, the other of said guide structures being yieldable radially with respect to said bearing support, each of said lunette guide structures comprising a lunette member having a concave surface portion engaged with one each of said opposed surface portions of said cylindrical bearing surface, unbalance measuring means responsive to oscillations of said support due to unbalance of the rotor, displacement control means including a control shaft connected with said one lunette guide structure for displacing said one guide structure along said inclined bearing surface to displace said journal structure in accordance with unbalance measured by said measuring means so as to adjust the eccentricity of rotation of said journal structure and of said holding means relative to said bearing support and thus to adjust the rotational axis of said holding means and rotor as a unit into a predetermined relation with respect to the inertia axis of the rotor, differential gearing means operably connected between said motor, said holding means, said journal structure and said adjusting means for coordinating relative movement therebetween to provide continuous rotation of said holding means and said journal structure, and an axially displaceable tool located in radially fixed position relative to said journal structure for machining the rotor about said adjusted rotational axis of said holding means during the continued rotation of said rotor.

18. A rotor-balancing machine comprising a base, a bearing support resiliently mounted for oscillation on said base, a hollow shaft journalled for rotation about its central longitudinal axis in said support, an inherently balanced rotor-holding structure having holding means for securing a rotor to said hollow shaft in fixed relation thereto to form a unit for rotation therewith, a journal structure on said support surrounding said shaft and being displaceable radially and peripherally with respect to said hollow shaft for varying the positional relation of the journal axis relative to said axis of rotation of said shaft, said journal structure comprising a control spindle having a plurality of eccentric displacement faces on its periphery, a drive motor, said rotor-holding structure being journalled in said journal structure and connected to said motor for rotation about said journal axis, displacement control means comprising bearing guide structures shiftable along said displacement faces of said journal structure for varying said positional relation to secure a desired balance condition of the rotor during rotation of said holding structure, adjusting means operatively connected between said unit and said journal structure for adjusting their angular position relative to each other during operation of the machine, compensating means for compensating the eccentric mass of said journal structure, and differential transmission means connected between said motor, said hollow shaft, said journal structure and said adjusting means for coordinating relative movement therebetween to provide continuous rotation of said hollow shaft, and said unit during movement of said adjusting means while the latter is adjusting said angular position.

19. A rotor-balancing machine comprising a base, a bearing support resiliently mounted for oscillation on said base, hollow shaft means journalled for rotation about its central longitudinal axis in said support, a holder structure for securing the rotor to be balanced in fixed relation to said shaft means to rotate as a unit therewith, a journal structure on said support surrounding said shaft means and being displaceable radially and peripherally with respect to said shaft means for varying the positional relation of the journal axis to said axis of rotation of said shaft means, said journal structure comprising a control spindle having a plurality of eccentric displacement faces on its periphery, said holder structure being rotatably mounted in said journal structure for rotation about said journal axis, displacement control means comprising bearing guide structures shiftable along said displacement faces of said journal structure for controlling said positional relation, said holder structure being balanced when said journal axis and said axis of rotation are coincident, unbalance compensating means responsive to displacement of said holder structure for compensating its unbalance resulting from such displacement, adjusting means operatively connected between said unit and said journal structure for adjusting their angular position relative to each other during operation of the machine, and differential gearing means operably connected between said motor, said hollow shaft, said journal structure and said adjusting means for coordinating relative movement therebetween to provide continuous rotation of said hollow shaft, and unit during movement of said adjusting means while the latter is adjusting said angular position.

20. A machine for balancing rotors, comprising a fixed base, a bearing support resiliently mounted for oscillation relative to said base, rotatable holding means for receiving the rotor in non-rotatable relation thereto, a journal structure of variable eccentricity relative to said holding means for supporting said holding means and mounted for rotation within said bearing support, bearing means mounted on said oscillatory support and in journalling engagement with said journal structure, said bearing means being displaceable radially relative to the axis of said journal structure for varying the amount and position of said eccentricity of said journal structure, unbalance measuring means responsive to oscillations of said support due to unbalance of the rotor, said measuring means including a phase generator connected for cooperative rotation with said rotatable holding means, displacement control means connected with said bearing means for displacing said bearing means in accordance with unbalance amount measured by said measuring means to thereby adjust said amount of eccentricity, a drive motor drivingly connected with said phase generator, said generator having a rotatably adjustable stator, a differential mechanism interconnecting said drive motor and said journal structure, said differential mechanism comprising means connecting said stator with said journal structure for adjusting said position of eccentricity of said journal structure relative to said holding means, and means to adjust the relative angular positions of said journal structure with respect to the holding means.

21. In a balancing machine having resiliently journalled and individually balanced rotor holding means, a center-machining device for balance-centering a rotor on its inertia axis, comprising means for firmly and immovably joining the rotor with said holding means to form therewith a rigid unit, drive means for rotating said unit at a first uniform speed to produce journal oscillations due to unbalance of the rotor, means for displacing during rotation thereof the holding means and rotor as a unit together with its rotational axis to a position wherein said oscillations vanish, means for rotating the unit about the rotation axis thus displaced at a second uniform speed lower than said first speed, and means for machining the rotor on said holding means rotating about said displaced axis at said second speed, said machining means being mounted so as to be unmoved by the displacement of said means for displacing said holding means and rotor as a unit.

22. A centering device for balance-centering a rotor mounted in rotatable and resiliently journalled holding means comprising marking means for marking said rotor, driving means for rotating said rotor, journal means connected to said driving means for rotating the holding means and rotor as a unit about a common rotational axis to produce journal oscillations in relation to a first position of said common axis due to unbalance of the rotor, adjusting means for shifting said unit during continuous rotation thereof about said common axis to a marking position displaced from said first position, said marking position being defined by said rotational axis of said unit coinciding with the inertia axis of said rotor and further coinciding with the axis of said marking means, and means for advancing said marking means toward said rotor during such continuous rotation of said unit to thereby mark an indication corresponding to the displaced common axis and inertia axis onto the rotor, said machining means being mounted so as to be unmoved by the displacement of said means for displacing said holding means and rotor as a unit.

23. A machine for balancing rotors, comprising a fixed base, a bearing support oscillatorily mounted relative said base, a rotatable holding means for receiving the rotor, said holding means comprising a journal structure having a cylindrical bearing surface inclined with respect to the axis of rotation of said rotatable holding means, a pair of diametrically opposed lunette guide structures bearing against said cylindrical bearing surface at diametrically opposed surface positions thereof, one of said guide structures being slidingly engaged with respect to said cylindrical bearing surface for displacing said holding means relative said structure, each of said lunette guide structures comprising a lunette member having a concave surface portion engaged with one each of said opposed surface portions of said cylindrical bearing surface, one of said lunette guide structures comprising a lunette holder having a guide roller, displacement control means connected with said one lunette guide structure for displacing said journal structure in accordance with measured unbalance to adjust the rotational axis of said holding means into a predetermined relation with respect to the inertia axis of the rotor, said guide roller being rotatably disposed in a slot in said displacement control means.

24. A machine for balancing rotors, comprising a fixed base, a bearing support oscillatorily mounted relative said base, a rotatable holding means for receiving the rotor, said holding means comprising a journal structure having a cylindrical bearing surface inclined with respect to the axis of rotation of said rotatable holding means, a pair of diametrically opposed lunette guide structures bearing against said cylindrical bearing surface at diametrically opposed surface positions thereof, one of said guide structures being slidingly engaged with respect to said cylindrical bearing surface for displacing said holding means relative said structure, each of said lunette guide structures comprising a lunette member having a concave surface portion engaged with one each of said opposed surface portions of said cylindrical bearing surface, one of said lunette guide structures comprising a lunette holder seated on a plurality of barrel-shaped roller members, and a cage for supporting said roller members and fixed with respect to said displacement control means.

25. A machine for balancing rotors, comprising a fixed base, a bearing support oscillatorily mounted relative to said base, rotatable holding means for receiving the rotor, a universal joint mechanism interconnecting said holding means and the rotor, said holding means having a journal structure of variable eccentricity relative to said holding means, bearing means mounted on said oscillatory support and in journalling engagement with said structure, unbalance measuring means responsive to oscillations of said support due to unbalance of the rotor, control means in operative connection with said journal structure for varying said eccentricity in accordance with unbalance measured by said measuring means to thereby adjust the axis of rotation relative to said holding means into a predetermined relation with respect to the inertia axis of the rotor, and axially displaceable tool means for machining the rotor about said adjusted axis of rotation.

26. A machine for balancing rotors, comprising a fixed base, a bearing support oscillatorily mounted relative to said base, rotatable holding means for receiving the rotor, said holding means having a journal structure of variable eccentricity relative to said holding means, bearing means mounted on said oscillatory support and in journalling engagement with said structure, said bearing means being linearly and continuously displaceable relative to said structure for varying said eccentricity, electrically operated zero-centered unbalance measuring means responsive to oscillations of said support due to unbalance of the rotor, displacement control means connected with said bearing means for displacing said bearing means, means responsive to unbalance in said measuring means for automatically displacing said bearing means in accordance with unbalance measured by said measuring means to thereby adjust the axis of rotation relative to said holding means into a predetermined relation with respect to the inertia axis of the rotor, and variable resistance means in circuit with said unbalance measuring means and controlled by said displacement control means for counteracting unbalancing effects of said displacement control means.

27. A machine for balancing rotors, comprising a fixed base, a bearing support member oscillatorily mounted with respect to said base, drive means connectable with a rotor for rotating said rotor, rotatable bearing means within which said drive means is journalled, said bearing means comprising an elongated bearing sleeve member having a substantially square cross-section, two pairs of apertured eccentric members axially interspaced along said sleeve member, the discs of each pair having a pair of resilient members interconnecting respective ones of pairs of opposed interior surface portions of each of said pairs, said pairs of interconnecting members each having central portions in oppositionally constrained abutment with opposed surface portions of said sleeve member, the abutment of the central portions of the interconnecting members of said pairs being right angularly disposed with respect to the abutment with said sleeve member, the eccentricity of the discs of one of said pairs being angularly displaced, with respect to the axis of rotation of said sleeve member, from the eccentricity of the discs of the other of said pairs, and displacement control means cooperative with the eccentric surfaces of said discs for displacing the rotative axis of said drive means, said displacement control means comprising mechanism for journalling said bearing means in said bearing support member.

28. A machine for balancing rotors, comprising a fixed base, a bearing support oscillatorily mounted relative to said base, rotatable holding means for receiving the rotor, said holding means having a journal structure of variable eccentricity relative to said holding means, bearing means mounted on said oscillatory support and in journalling engagement with said structure, said bearing means being displacable relative to said structure for varying said eccentricity, unbalance measuring means including a phase generator connected for cooperative rotation with said rotatable holding means and responsive to oscillations of said support due to unbalance of the rotor, displacement control means connected with said bearing means for displacing said bearing means in accordance with unbalance measured by said measuring means to thereby adjust the axis of rotation relative to said holding means into a predetermined relation with respect to the inertia axis of the rotor, a drive motor connected with said phase generator, a differential mechanism interconnecting said drive motor and said rotatable holding means, said differential mechanism comprising automatically operating means for adjusting the angular position of the rotational axis of the rotor with respect to the angular position of said holding means in response to unbalance vibrations of the rotor.

29. A machine for balancing rotors, comprising a fixed base, a bearing support member oscillartorily mounted with respect to said base, drive means connectable with a rotor for rotating said rotor, rotatable bearing means within which said drive means is journalled, said bearing means comprising a pair of axially spaced cam surfaces of angular disposition relative to the axis of rotation of said drive means displacement control means cooperative with said cam surface for displacing the rotative axis of said drive means, said displacement control means comprising a pair of sliding cam drive members, one cooperative with each of said cam surfaces, a screw spindle mechanism interconnecting said cam drive members for simultaneous motion thereof upon rotation of said screw spindle, gear drive means interconnected with said spindle, resilient thrust bearing means operative axially with respect to said screw spindle to minimize lost motion in said gear drive interconnection means, mechanism for journalling said bearing means, and flexible interconnecting means between the axial ends of said journalling mechanism and opposite end portions, respectively, of said bearing support member to allow displacement of the rotation axis of said drive means upon actuation of said displacement control means.

30. A machine for balancing rotors, comprising a fixed base, a bearing support member oscillatorily mounted with respect to said base, drive means rigidly connectable with a rotor for rotating said rotor, rotatable bearing means within which said drive means is journalled said bearing means comprising a pair of axially spaced cam surfaces of angular disposition relative to the axis of rotation of said drive means, displacement control means cooperative with said cam surfaces for displacing the rotative axis of said drive means, mechanism for journalling said bearing means, and flexible interconnecting means between the axial ends of said journalling mechanism and opposite end portions, respectively, of said bearing support member to allow displacement of the rotation axis of said drive means upon actuation of said displacement control means.

31. A machine for balancing rotors, comprising a fixed base, a bearing support member oscillatorily mounted with respect to said base, drive means connectable with a rotor for rotating said rotor, rotatable bearing means within which said drive means is journalled, said bearing means comprising a pair of axially spaced cam surfaces of angular disposition relative to the axis of rotation of said drive means, displacement control means cooperative with said cam surface for displacing the rotative axis of said drive means, and frictionless bearing mechanism for journalling each end of said bearing means, said bearing mechanism being resiliently interconnected with said bearing support member to allow displacement of the rotation axis of said drive means upon actuation of said displacement control means.

32. A machine for balancing rotors, comprising a fixed base, a bearing support oscillatorily mounted relative to said base, rotatable holding means for receiving the rotor, said holding means having a journal structure of variable eccentricity relative to said holding means, bearing means mounted on said oscillatory support and in journalling engagement with said structure, said bearing means being linearly and continuously displaceable relative to said structure for varying said eccentricity, unbalance measuring means responsive to oscillations of said support due to unbalance of the rotor, displacement control means connected with said bearing means for displacing said bearing means, said control means being connected to said measuring means for automatically displacing said bearing means in accordance with unbalance measured by said measuring means to thereby adjust the axis of rotation relative to said holding means into a predetermined relation with respect to the inertia axis of the rotor.

33. A machine for balancing rotors, comprising a fixed base, a bearing support oscillatorily mounted with respect to said base and defining a geometric axis of rotation in fixed relation to said support, journal means displaceably mounted on said support and having a journal axis adjustable relative to said axis of rotation, holder means for holding the rotor to be balanced, said holder means being journalled in said journal means for rotation about said journal axis, displacement control means connected with said journal means for displacing said journal means relative to said support to thereby adjust said journal axis, unbalance-measuring means including a measuring instrument having a pointer deflectable in two directions from a zero position of balance to indicate unbalance in each of two directions, a single-pole double-throw switch actuated by said pointer and operative to throw said switch to one pole or the other, when said electrical measuring instrument is unbalanced, in dependence upon the particular direction of unbalance, reversible drive means interconnecting said switch and said displacement control means and operative to actuate said displacement control means to move said journal axis in the direction of balance.

34. A machine for balancing rotors, comprising a fixed base, a bearing support member oscillatorily mounted with respect to said base, drive means connectable with a rotor for rotating a rotor, rotatable bearing means within which said drive means is journalled, said bearing means comprising an elongated bearing sleeve member having a substantially square cross-section, two pairs of apertured disc members circumjacent said sleeve member, said pairs being mutually spaced apart along said sleeve member, the discs of each pair having a pair of longitudinal resilient members interconnecting respective ones of pairs of opposed interior surface portions of each of said pairs, said pairs of interconnecting members each having central portions connected with opposed surface portions of said sleeve members, the connections of the central portions of the interconnecting members of said pairs with the surface portions of said sleeve member being mutually right angularly oriented with respect to the abutment with said sleeve member, ball bearing journalling means for rotatably supporting each of said disc members, and displacement control means for moving the ball bearing journalling means of the discs of each of said pairs relative each other without lost motion.

35. A machine for balancing rotors, comprising a fixed base, a bearing support member oscillatorily mounted with respect to said base, drive means connectable with a rotor for rotating a rotor, rotatable bearing means within which said drive means is journaled, said bearing means comprising an elongated bearing sleeve member having a substantially square cross-section, two pairs of apertured disc members circumjacent said sleeve member, said pairs being mutually spaced apart along said sleeve member, the discs of each pair having a pair of longitudinal resilient members interconnecting respective ones of pairs of opposed interior surface portions of each of said pairs, said pairs of interconnecting members each having central portions connected with opposed surface portions of said sleeve member, the connections of the central portions of the interconnecting members of said pairs with the surface portions of said sleeve member being mutually right angularly oriented with respect to the abutment with said sleeve member, ball bearing journalling means for rotatably supporting each of said disc member, displacement control means for moving the ball bearing journalling means of the discs of each of said pairs relative each other without lost motion, said displacement control means comprising a ring member surrounding each of said disc members, said bearing support member comprising a cylindrical structure surrounding said ring members, opposed pairs of leaf springs interconnecting said ball bearing journalling means with its respective surrounding ring member, and opposed pairs of leaf springs interconnecting each of said ring members with said housing.

36. A machine for balancing rotors, comprising a fixed base, a bearing support member oscillatorily mounted with respect to said base, drive means connectable with a rotor for rotating a rotor, rotatable bearing means within which said drive means is journaled, said bearing means comprising an elongated bearing sleeve member having a substantially square cross-section, two pairs of apertured disc members circumjacent said sleeve member, said pairs being mutually spaced apart along said sleeve member, the discs of each pair having a pair of longitudinal resilient members interconnecting respective ones of pairs of opposed interior surface portions of each of said pairs, said pairs of interconnecting members each having central portions connected with opposed surface portions of said sleeve member, the connections of the central portions of the interconnecting members of said pairs with the surface portions of said sleeve member being mutually right angularly oriented with respect to the abutment with said sleeve member, ball bearing journalling means for rotatably supporting each of said disc members, displacement control means for moving the ball bearing journalling means of the discs of each of said pairs relative each other without lost motion, said displacement control means comprising a ring member surrounding each of said disc members, said bearing support member comprising a cylindrical structure surrounding said ring members, opposed pairs of leaf springs interconnecting said ball bearing journalling means with its respective surrounding ring member, and opposed pairs of leaf springs interconnecting each of said ring members with said housing, said drive means extending beyond the axial end of said bearing support member, the clearance space between said drive means and said bearing support member being sealed with resilient material to provide a seal and yet allow relative movement of said bearing means with respect to said bearing support member.

References Cited in the file of this patent

UNITED STATES PATENTS

| | | |
|---|---|---|
| 1,761,945 | Van Degrift | June 3, 1930 |
| 2,140,398 | Buckingham | Dec. 13, 1938 |
| 2,219,795 | Van Degrift | Oct. 29, 1940 |
| 2,243,379 | Johnson | May 27, 1941 |
| 2,315,998 | Haeger | Apr. 6, 1943 |
| 2,389,858 | Kyle | Nov. 27, 1945 |
| 2,399,271 | Vonada | Apr. 30, 1946 |
| 2,445,634 | Plumb | July 20, 1948 |
| 2,536,566 | Pascoe | Jan. 2, 1951 |
| 2,693,695 | Jacobsen et al. | Nov. 9, 1954 |
| 2,746,299 | Ferdern et al. | May 22, 1956 |